(12) United States Patent
Marukame et al.

(10) Patent No.: US 11,461,075 B2
(45) Date of Patent: Oct. 4, 2022

(54) ARITHMETIC DEVICE

(71) Applicant: KABUSHIKI KAISHA TOSHIBA, Minato-ku (JP)

(72) Inventors: Takao Marukame, Chuo (JP); Koichi Mizushima, Kamakura (JP); Kumiko Nomura, Shinagawa (JP); Yoshifumi Nishi, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 166 days.

(21) Appl. No.: 17/004,228

(22) Filed: Aug. 27, 2020

(65) Prior Publication Data

US 2021/0216282 A1 Jul. 15, 2021

(30) Foreign Application Priority Data

Jan. 10, 2020 (JP) .............................. JP2020-002936

(51) Int. Cl.
*G06F 7/57* (2006.01)
*G06F 7/503* (2006.01)
(Continued)

(52) U.S. Cl.
CPC ................ *G06F 7/57* (2013.01); *G05F 3/222* (2013.01); *G06F 7/503* (2013.01); *G06F 7/5443* (2013.01); *G06G 7/16* (2013.01)

(58) Field of Classification Search
CPC ........... G06G 7/16; G06F 7/5443; G06F 7/57; G06F 7/503; G06N 3/063; G06N 3/04;
(Continued)

(56) References Cited

U.S. PATENT DOCUMENTS 10,175,947 B1 * 1/2019 Marukame .............. G06F 7/487
2018/0211154 A1   7/2018 Mori et al.
(Continued)

FOREIGN PATENT DOCUMENTS

JP    2018-120433 A    8/2018
JP    2019-053563 A    4/2019
(Continued)

OTHER PUBLICATIONS

Notes, Electronics. "Active Transistor Constant Current Source." 2018, https://www.electronics-notes.com/articles/analogue_circuits/transistor/active-constant-current-source.php#:~:text=Transistor%20active%20constant%20current%20source%20basics&text=In%20this%20circuit%2C%20the%2 (Year: 2018).*
(Continued)

*Primary Examiner* — Emily E Larocque
*Assistant Examiner* — Huy Duong
(74) *Attorney, Agent, or Firm* — Maier & Maier, PLLC

(57) ABSTRACT

According to an embodiment, an arithmetic device includes a comparator, M cross switches, and M coefficient circuits. The comparator compares a first voltage generated at a first comparison terminal and a second voltage generated at a second comparison terminal. The M cross switches are provided corresponding to the M input signals. The M coefficient circuits are provided corresponding to the M coefficients, and each includes a first constant current source and a second constant current source. Each of the M cross switches performs switching between a straight state and a reverse state. In each of the M coefficient circuits, the first constant current source is connected between a positive output terminal of the corresponding coefficient circuit and a reference potential, and the second constant current source is connected between a negative output terminal of the corresponding coefficient circuit and the reference potential.

18 Claims, 14 Drawing Sheets

(51) Int. Cl.
*G06F 7/544* (2006.01)
*G06G 7/16* (2006.01)
*G05F 3/22* (2006.01)

(58) Field of Classification Search
CPC .............. G06N 3/08; G11C 13/004; G11C 2013/0042; G11C 2013/0045; G05F 3/00; G05F 3/02; G05F 3/20; G05F 3/22–267
See application file for complete search history.

(56) References Cited

U.S. PATENT DOCUMENTS

| | | | |
|---|---|---|---|
| 2019/0156181 A1 | 5/2019 | Marukame et al. |
| 2020/0026496 A1 | 1/2020 | Marukame et al. |
| 2020/0034695 A1 | 1/2020 | Marukame et al. |
| 2020/0160160 A1 | 5/2020 | Kim et al. |
| 2020/0293861 A1 | 9/2020 | Marukame et al. |
| 2020/0379733 A1 | 12/2020 | Berdan et al. |
| 2020/0380347 A1 | 12/2020 | Marukame et al. |
| 2021/0056383 A1 | 2/2021 | Nishi et al. |
| 2021/0081771 A1 | 3/2021 | Marukame et al. |

FOREIGN PATENT DOCUMENTS

| | | | |
|---|---|---|---|
| JP | 2019-095860 A | 6/2019 | |
| JP | 2020-013398 A | 1/2020 | |
| JP | 2020-017114 A | 1/2020 | |
| JP | 2020-149625 A | 9/2020 | |
| JP | 2020-197761 A | 12/2020 | |
| JP | 2020-197922 A | 12/2020 | |
| JP | 2021-33415 A | 3/2021 | |
| JP | 2021-47530 A | 3/2021 | |
| WO | WO-2004025824 A1 * | 3/2004 | ............... H03B 5/04 |

OTHER PUBLICATIONS

Bae et al., "High-Density and Near-Linear Synaptic Device Based on a Reconfigurable Gated Schottky Diode", *IEEE Electron Device Letters*, vol. 38, No. 8, Aug. 2017, pp. 1153-1156.

Lee et al., "Neuromorphic Technology Based on Charge Storage Memory Devices", 2018 Symposium on VLSI Technology Digest of Technical Papers, 2018, pp. 169-170.

Lim et al., "Highly Reliable Inference System of Neural Networks Using Gated Schottky Diodes", IEEE Journal of the Electron Devices Society, vol. 7, Apr. 25, 2019, pp. 522-528.

Bae et al., "Near-Linear Potentiation Mechanism of Gated Schottyky Diode as a Synaptic Device", IEEE Journal of the Electron Devices Society, vol. 7, Feb. 12, 2019, pp. 335-343.

Lim et al., "Hardware-based Neural Networks using a Gated Schottky Diode as a Synapse Device", IEEE International Symposium on Circuits and Systems (ISCAS), 2018, 5 pages.

Marukame et al., "Nonlinear Operation of Static-Binary Neuron Circuits and Dynamic Memristive Devices for STDP Learning", 2019 IEEE International Symposium on Circuits and Systems (ISCAS), May 25-29, 2019, 5 pages.

* cited by examiner

ARITHMETIC DEVICE

CROSS-REFERENCE TO RELATED APPLICATIONS

This application is based upon and claims the benefit of priority from Japanese Patent Application No. 2020-002936, filed on Jan. 10, 2020; the entire contents of which are incorporated herein by reference.

FIELD

Embodiments described herein relate generally to an arithmetic device.

BACKGROUND

Deep learning techniques using a neural network are known. Furthermore, techniques that perform deep learning using dedicated hardware have also been studied.

Each of units included in the neural network executes a product-sum (multiply-accumulate) operation. More specifically, the units respectively multiply input signals received from the preceding-stage units by coefficients, and then add up the input signals multiplied by the coefficients. Furthermore, the units apply the values calculated in this manner to activation functions. Then, the units output the output values of the activation functions.

A neural network device implemented by hardware requires a large number of such units. Thus, in the case where the neural network is implemented by hardware, it is desired that the product-sum operation in each unit can be executed with a simple configuration and high accuracy.

DETAILED DESCRIPTION

According to an embodiment, an arithmetic device configured to receive M input signals (M is an integer of 2 or more) each representing a binary value and receive M coefficients and output an output signal representing a binary value, includes a first resistor, a second resistor, a comparator, M cross switches, and M coefficient circuits. The first resistor is connected between a voltage source and a first comparison terminal, the voltage source being configured to generate a predetermined power supply voltage. The second resistor is connected between the voltage source and a second comparison terminal, the second resistor having a same resistance value as the first resistor. The comparator is configured to output the output signal representing a value corresponding to a result of comparison between a first voltage generated at the first comparison terminal and a second voltage generated at the second comparison terminal. The M cross switches are provided corresponding to the M input signals. The M coefficient circuits are provided corresponding to the M coefficients. Each of the M cross switches performs switching between a straight state in which a positive input terminal is connected to a positive output terminal and a negative input terminal is connected to a negative output terminal and a reverse state in which the positive input terminal is connected to the negative output terminal and the negative input terminal is connected to the positive output terminal. In each of the M cross switches, the positive input terminal is connected to the first comparison terminal, and the negative input terminal is connected to the second comparison terminal. The M cross switches correspond one-to-one to the M coefficient circuits. Each of the M coefficient circuits includes a first constant current source and a second constant current source, and is capable of changing a current difference between a current flowing through the first constant current source and a current flowing through the second constant current source. In each of the M coefficient circuits, the first constant current source is connected between the positive output terminal of the corresponding cross switch and a reference potential, and the second constant current source is connected between the negative output terminal of the corresponding cross switch and the reference potential.

Hereinafter, an arithmetic device 10 according to embodiments will be described in detail with reference to the drawings. The arithmetic device 10 according to the embodiments execute an operation that simulates neurons with a simple configuration and high accuracy.

First Embodiment

Figure 1:
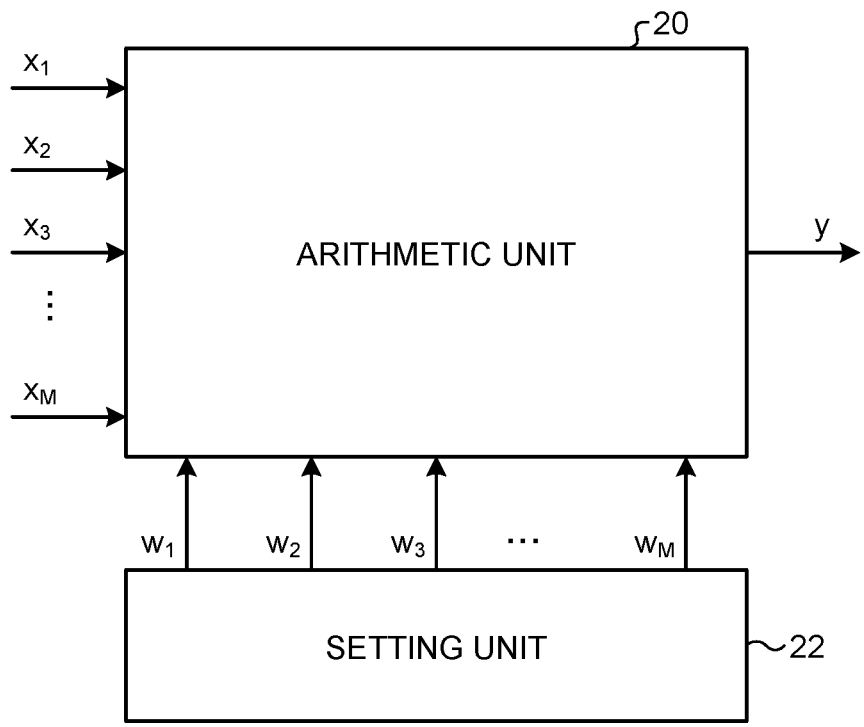
FIG. 1 is a configuration diagram of an arithmetic device according to an embodiment.

FIG. 1 is a diagram illustrating the configuration of the arithmetic device 10 according to a first embodiment. The arithmetic device 10 includes an arithmetic unit 20 and a setting unit 22.

The arithmetic unit 20 receives M input signals each of which is represented by a binary value and M coefficients. M is an integer equal to or larger than 2. The M coefficients correspond one-to-one to the M input signals. In the present embodiment, each of the M coefficients is a binary value.

The setting unit 22 receives the M coefficients, for example, from a learning device. The setting unit 22 sets the M coefficients to the arithmetic unit 20.

The arithmetic unit 20 receives the M input signals from other units. Upon reception of the M input signals, the arithmetic unit 20 performs a product-sum (multiply-accumulate) operation of the received M input signals and the set M coefficients. Then, the arithmetic unit 20 outputs an output signal represented by a binary value as a result of the product-sum operation.

In the present embodiment, the M input signals are denoted by $x_1, x_2, x_3, \ldots, x_M$. Furthermore, in the present embodiment, the M coefficients are denoted by $w_1, w_2, w_3, \ldots, w_M$. Furthermore, in the present embodiment, the output signal is denoted by y. Subscripts denote indexes. An input signal and a coefficient with the same index attached correspond to each other. That is, $x_1$ and $w_1$ correspond to each other, $x_2$ and $w_2$ correspond to each other, and $x_M$ and $w_M$ correspond to each other. An input signal with an arbitrary index (i) is denoted by $x_i$, and a coefficient with an arbitrary index (i) is denoted by $w_i$, where i is an integer from 1 to M.

Figure 2:
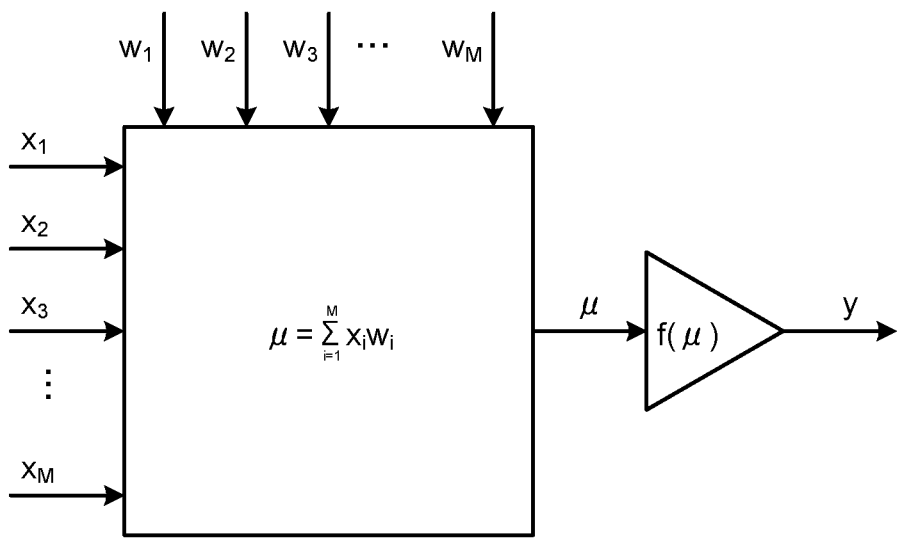
FIG. 2 is a diagram for describing details of arithmetic processing performed by the arithmetic device.

FIG. 2 is a diagram for describing details of arithmetic processing performed by the arithmetic device 10.

In the present embodiment, each of the M input signals represents either value −1 or +1 as represented by the following Formula (11).

$$x_i = \{-1, +1\} \tag{11}$$

In the present embodiment, each of the M coefficients represents either value −1 or +1 as represented by the following Formula (12).

$$w_i = \{-1, +1\} \tag{12}$$

In the present embodiment, the output signal represents either value −1 or +1 as represented by the following Formula (13).

$$y = \{-1, +1\} \tag{13}$$

Upon reception of M input signals, the arithmetic unit 20 executes a product-sum operation of the M input signals and M coefficients by analog processing. For example, the arithmetic unit 20 designates μ calculated by the following Formula (14) as an intermediate value.

$$\mu = \sum_{i=1}^{M} x_i w_i \tag{14}$$

The intermediate value represents a value of a predetermined number of bits which is the accumulation of M multiplication values each obtained by multiplying each of the M input signals by a coefficient corresponding thereto. The arithmetic unit 20 performs sign function processing on a signal representing such an intermediate value to generate a binary output signal. That is, the arithmetic unit 20 performs arithmetic processing of the following Formula (15) on the signal representing the intermediate value.

$$y = f(\mu) \tag{15}$$

Note that f( ) denotes a sign function, and y denotes a value of the output signal.

The sign function outputs −1 when an argument (intermediate value) is smaller than zero, and outputs +1 when the argument (intermediate value) is equal to or larger than zero. That is, the sign function is a function as represented by the following Formula (16).

$$f(\mu) = \begin{cases} -1, & \mu < 0 \\ +1, & \mu \geq 0 \end{cases} \tag{16}$$

Figure 3:
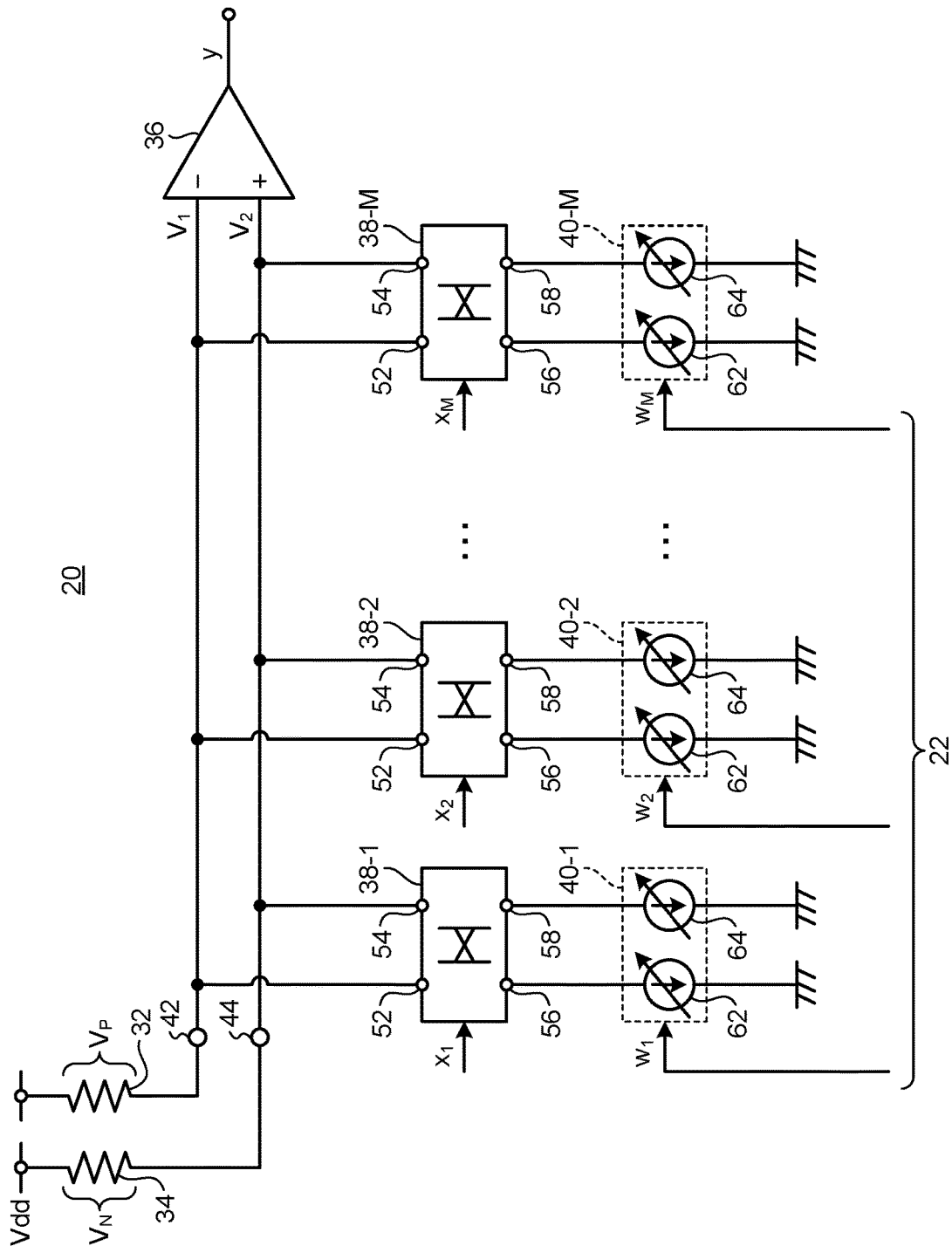
FIG. 3 is a hardware configuration diagram of an arithmetic unit.

FIG. 3 is a diagram illustrating the hardware configuration of the arithmetic unit 20. The arithmetic unit 20 includes a comparator 36, a first resistor 32, a second resistor 34, M cross switches 38, and M coefficient circuits 40.

The first resistor 32 is connected between a voltage source which generates a predetermined power supply voltage (Vdd) and a first comparison terminal 42. The second resistor 34 is connected between the voltage source which generates the predetermined power supply voltage (Vdd) and a second comparison terminal 44. The first resistor 32 and the second resistor 34 have the same resistance value.

The comparator 36 outputs an output signal (y) which represents a value corresponding to a result of comparison between a first voltage ($V_1$) generated at the first comparison terminal 42 and a second voltage ($V_2$) generated at the second comparison terminal 44. In the present embodiment, the comparator 36 outputs an output signal (y) representing −1 when a voltage obtained by subtracting the first voltage ($V_1$) from the second voltage ($V_2$) is smaller than zero. The comparator 36 outputs an output signal (y) representing +1 when the voltage obtained by subtracting the first voltage ($V_1$) from the second voltage ($V_2$) is equal to or larger than zero.

A voltage generated at the first resistor 32 is referred to as a positive-side voltage ($V_P$). A voltage generated at the second resistor 34 is referred to as a negative-side voltage ($V_N$). In this case, the first voltage ($V_1$) is Vdd−$V_P$. The second voltage ($V_2$) is Vdd−$V_N$. Thus, in the present embodiment, the comparator 36 outputs the output signal (y) representing −1 when the voltage obtained by subtracting the negative-side voltage ($V_N$) from the positive-side voltage ($V_P$) is smaller than zero. On the other hand, in the present embodiment, the comparator 36 outputs the output signal (y) representing +1 when the differential voltage ($V_d$) obtained by subtracting the negative-side voltage ($V_N$) from the positive-side voltage ($V_P$) is equal to or larger than zero.

The M cross switches 38 are provided corresponding to the M input signals. In the present embodiment, the arithmetic unit 20 includes a first cross switch 38-1 to an Mth cross switch 38-M as the M cross switches 38. For example, the first cross switch 38-1 corresponds to the first input signal ($x_1$), the second cross switch 38-2 corresponds to the second input signal ($x_2$), and the Mth cross switch 38-M corresponds to the Mth input signal ($x_M$).

Each of the M cross switches 38 includes a positive input terminal 52, a negative input terminal 54, a positive output terminal 56, and a negative output terminal 58.

The positive input terminal 52 of each of the M cross switches 38 is connected to the first comparison terminal 42. The negative input terminal 54 of each of the M cross switches 38 is connected to the second comparison terminal 44.

The positive output terminal 56 of each of the M cross switches 38 is connected to either the positive input terminal 52 or the negative input terminal 54. The negative output terminal 58 of each of the M cross switches 38 is connected to the other terminal, the positive input terminal 52 or the negative input terminal 54, that is not connected with the positive output terminal 56. Each of the M cross switches 38 switches connection destination of the positive output terminal 56 and the negative output terminal 58 between the positive input terminal 52 and the negative input terminal 54 according to a value of the corresponding input signal.

That is, each of the M cross switches 38 switches between a straight state and a reverse state according to the value of the corresponding input signal. The straight state is a state in which the positive input terminal 52 is connected to the positive output terminal 56, and the negative input terminal 54 is connected to the negative output terminal 58. The reverse state is a state in which the positive input terminal 52 is connected to the negative output terminal 58, and the negative input terminal 54 is connected to the positive output terminal 56.

In the present embodiment, each of the M cross switches 38 switches to the straight state when the value of the corresponding input signal is +1, and switches to the reverse state when the value of the corresponding input signal is −1. Alternatively, each of the M cross switches 38 may switch to the reverse state when the value of the corresponding input signal is +1, and switch to the straight state when the value of the corresponding input signal is −1.

The M coefficient circuits 40 are provided corresponding to the M coefficients. In the present embodiment, the arithmetic unit 20 includes a first coefficient circuit 40-1 to an Mth coefficient circuit 40-M as the M coefficient circuits 40. For example, the first coefficient circuit 40-1 corresponds to the first coefficient ($w_1$), the second coefficient circuit 40-2 corresponds to the second coefficient ($w_2$), and the Mth coefficient circuit 40-M corresponds to the Mth coefficient ($w_M$).

Note that the first coefficient ($w_1$) corresponds to the first input signal ($x_1$), the second coefficient ($w_2$) corresponds to the second input signal ($x_2$), and the Mth coefficient ($w_M$) corresponds to the Mth input signal ($x_M$). Thus, the M cross switches 38 correspond one-to-one to the M coefficient circuits 40. For example, the first coefficient circuit 40-1 corresponds to the first cross switch 38-1, the second coefficient circuit 40-2 corresponds to the second cross switch 38-2, and the Mth coefficient circuit 40-M corresponds to the Mth cross switch 38-M.

Each of the M coefficient circuits 40 includes a first constant current source 62 and a second constant current source 64. One end of the first constant current source 62 is connected to the positive output terminal 56 of the corresponding cross switch 38, and the other end thereof is connected to a reference potential (e.g., ground). That is, the first constant current source 62 is connected between the positive output terminal 56 of the corresponding cross switch 38 and the reference potential.

One end of the second constant current source 64 is connected to the negative output terminal 58 of the corresponding cross switch 38, and the other end thereof is connected to the reference potential (e.g., ground). That is, the second constant current source 64 is connected between the negative output terminal 58 of the corresponding cross switch 38 and the reference potential.

Each of the first constant current source 62 and the second constant current source 64 is a constant current source capable of changing the amount of current. A current difference between the first constant current source 62 and the second constant current source 64 is switched between positive and negative according to a value of the corresponding coefficient. For example, the setting unit 22 receives the M coefficients prior to reception of the M input signals. The setting unit 22 sets the positive or negative of the current difference between the first constant current source 62 and the second constant current source 64 included in the corresponding coefficient circuit 40 according to each of the received M coefficients.

Each of the M coefficient circuits 40 switches between a first state and a second state according to the corresponding coefficient. The first state is a state in which the first constant current source 62 sends a current having a first current value ($I_1$), and the second constant current source 64 sends a current having a second current value ($I_2$) which is different from the first current value ($I_1$). The second state is a state in which the first constant current source 62 sends the current having the second current value ($I_2$), and the second constant current source 64 sends the current having the first current value ($I_1$).

Note that, in the present embodiment, the second current value ($I_2$) is smaller than the first current value ($I_1$). Thus, in the present embodiment, the first state is a state in which the current flowing through the first constant current source 62 is larger than the current flowing through the second constant current source 64. On the other hand, the second state is a state in which the current flowing through the first constant current source 62 is smaller than the current flowing through the second constant current source 64.

In the present embodiment, each of the coefficient circuits 40 switches to the first state when the corresponding coefficient is +1, and switches to the second state when the corresponding coefficient is −1. Alternatively, each of the coefficient circuits 40 may switch to the second state when the corresponding coefficient is +1, and switch to the first state when the corresponding coefficient is −1.

Figure 4:
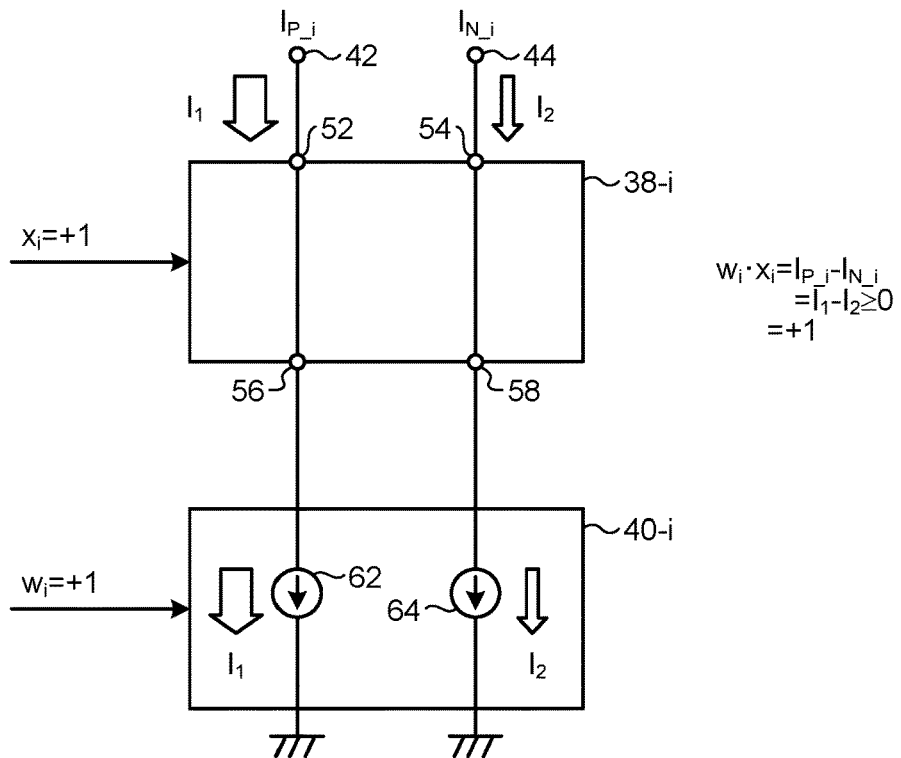
FIG. 4 is an explanatory diagram of an arithmetic operation in the case of $x_i=+1$ and $w_i=+1$.

FIG. 4 is a diagram for describing an arithmetic operation of the ith cross switch 38-*i* and the ith coefficient circuit 40-*i* in the case of $x_i=+1$ and $w_i=+1$.

When the ith input signal ($x_i$) is +1, the ith cross switch 38-*i* is brought into the straight state. When the ith coefficient ($w_i$) is +1, the ith coefficient circuit 40-*i* is brought into the first state. That is, when the ith coefficient ($w_i$) is +1, the first constant current source 62 is set to send the current having the first current value ($I_1$), and the second constant current source 64 is set to send the current having the second current value ($I_2$). Note that $I_1 > I_2$.

Thus, when the ith input signal ($x_i$) is +1 and the ith coefficient ($w_i$) is +1, the ith coefficient circuit 40-*i* draws the current having the first current value ($I_1$) from the first comparison terminal 42, and draws the current having the second current value ($I_2$) from the second comparison terminal 44.

In the arithmetic unit 20, a value ($w_i \cdot x_i$) obtained by multiplying the ith coefficient ($w_i$) by the ith input signal ($x_i$) is represented by a current difference ($I_{P\_i} - I_{N\_i}$) between a current ($I_{P\_i}$) flowing from the first comparison terminal 42 to the positive input terminal 52 of the ith cross switch 38-*i* and a current ($I_{N\_i}$) flowing from the second comparison terminal 44 to the negative input terminal 54 of the ith cross switch 38-*i*.

In the example of FIG. 4, $I_{P\_i}=I_1$ and $I_{N\_i}=I_2$, and the current difference ($I_{P\_i} - I_{N\_i}$) has a positive value. Thus, in the case of $x_i=+1$ and $w_i=+1$, the arithmetic unit 20 can derive +1 as the value ($w_i \cdot x_i$) obtained by multiplying the ith coefficient ($w_i$) by the ith input signal ($x_i$).

Figure 5:
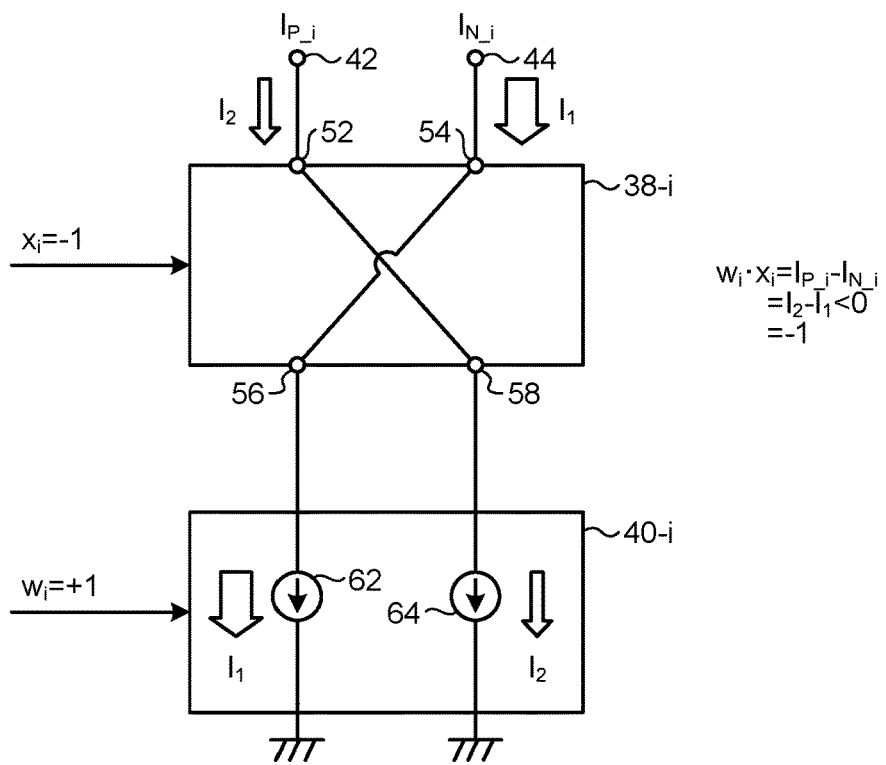
FIG. 5 is an explanatory diagram of an arithmetic operation in the case of $x_i=-1$ and $w_i=+1$.

FIG. 5 is a diagram for describing an arithmetic operation of the ith cross switch 38-*i* and the ith coefficient circuit 40-*i* in the case of $x_i=-1$ and $w_i=+1$.

When the ith input signal ($x_i$) is −1, the ith cross switch 38-*i* is brought into the reverse state. When the ith coefficient ($w_i$) is +1, the ith coefficient circuit 40-*i* is brought into the first state. That is, when the ith coefficient ($w_i$) is +1, the first constant current source 62 is set to send the current having the first current value ($I_1$), and the second constant current source 64 is set to send the current having the second current value ($I_2$).

Thus, when the ith input signal ($x_i$) is −1 and the ith coefficient ($w_i$) is +1, the ith coefficient circuit 40-$i$ draws the current having the second current value ($I_2$) from the first comparison terminal 42, and draws the current having the first current value ($I_1$) from the second comparison terminal 44.

In the example of FIG. 5, $I_{P\_i}=I_2$ and $I_{N\_i}=I_1$, and the current difference ($I_{P\_i}-I_{N\_i}$) has a negative value. Thus, in the case of $x_i=-1$ and $w_i=+1$, the arithmetic unit 20 can derive −1 as the value ($w_i \cdot x_i$) obtained by multiplying the ith coefficient ($w_i$) by the ith input signal ($x_i$).

Figure 6:
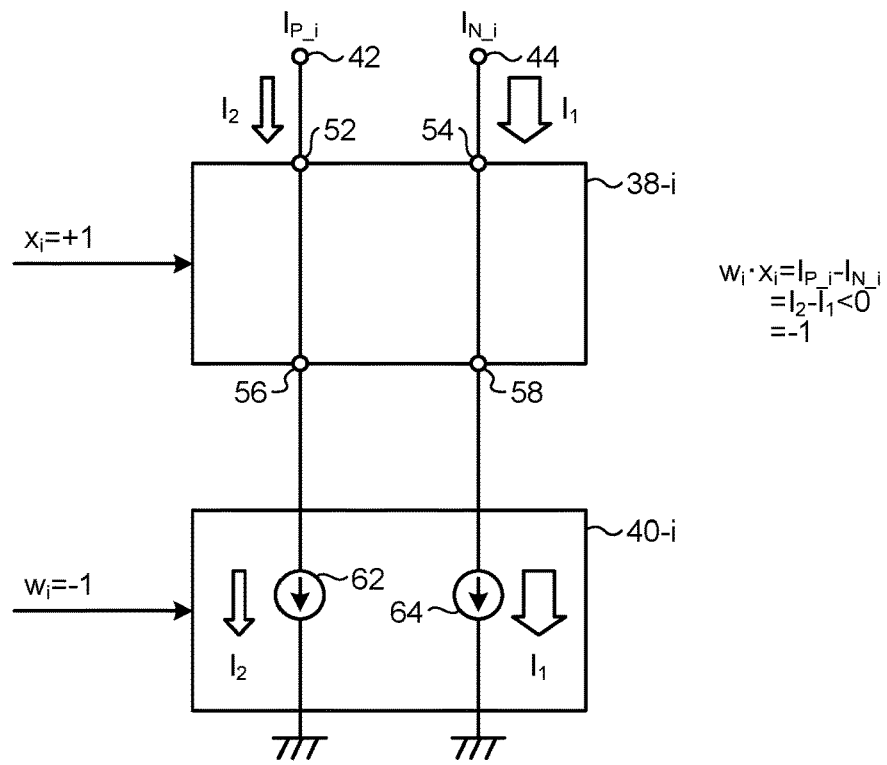
FIG. 6 is an explanatory diagram of an arithmetic operation in the case of $x_i=+1$ and $w_i=-1$.

FIG. 6 is a diagram for describing an arithmetic operation of the ith cross switch 38-$i$ and the ith coefficient circuit 40-$i$ in the case of $x_i=+1$ and $w_i=-1$.

When the ith input signal ($x_i$) is +1, the ith cross switch 38-$i$ is brought into the straight state. When the ith coefficient ($w_i$) is −1, the ith coefficient circuit 40-$i$ is brought into the second state. That is, when the ith coefficient ($w_i$) is −1, the first constant current source 62 is set to send the current having the second current value ($I_2$), and the second constant current source 64 is set to send the current having the first current value ($I_1$).

Thus, when the ith input signal ($x_i$) is +1 and the ith coefficient ($w_i$) is −1, the ith coefficient circuit 40-$i$ draws the current having the second current value ($I_2$) from the first comparison terminal 42, and draws the current having the first current value ($I_1$) from the second comparison terminal 44.

In the example of FIG. 6, $I_{P\_i}=I_2$ and $I_{N\_i}=I_1$, and the current difference ($I_{P\_i}-I_{N\_i}$) has a negative value. Thus, in the case of $x_i=+1$ and $w_i=-1$, the arithmetic unit 20 can derive −1 as the value ($w_i \cdot x_i$) obtained by multiplying the ith coefficient ($w_i$) by the ith input signal ($x_i$).

Figure 7:
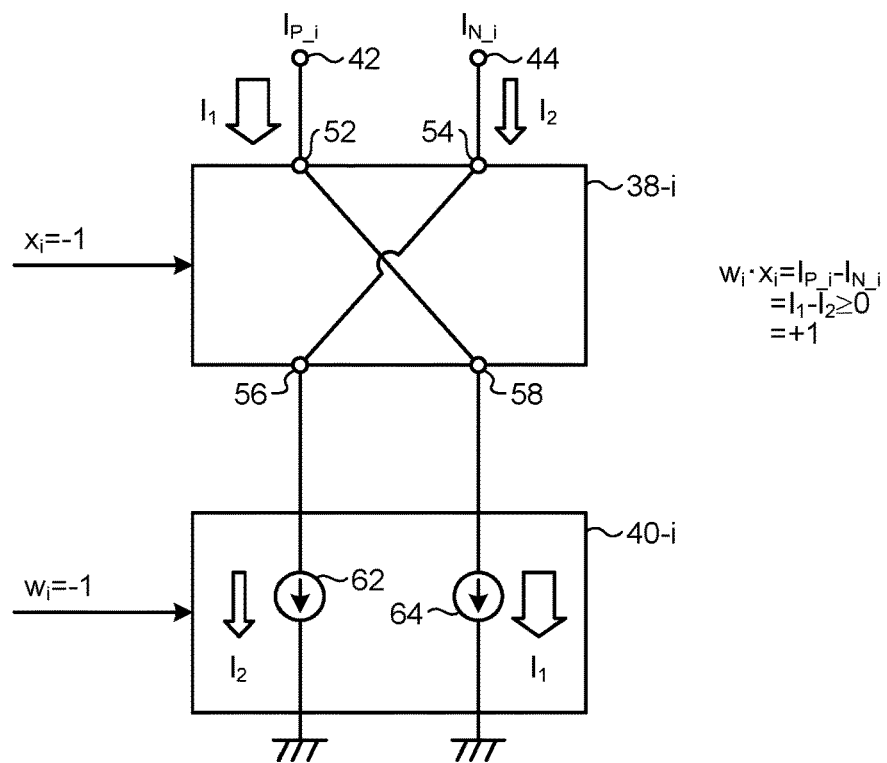
FIG. 7 is an explanatory diagram of an arithmetic operation in the case of $x_i=-1$ and $w_i=-1$.

FIG. 7 is a diagram for describing an arithmetic operation of the ith cross switch 38-$i$ and the ith coefficient circuit 40-$i$ in the case of $x_i=-1$ and $w_i=-1$.

When the ith input signal ($x_i$) is −1, the ith cross switch 38-$i$ is brought into the reverse state. When the ith coefficient ($w_i$) is −1, the ith coefficient circuit 40-$i$ is brought into the second state. That is, when the ith coefficient ($w_i$) is −1, the first constant current source 62 is set to send the current having the second current value ($I_2$), and the second constant current source 64 is set to send the current having the first current value ($I_1$).

Thus, when the ith input signal ($x_i$) is −1 and the ith coefficient ($w_i$) is −1, the ith coefficient circuit 40-$i$ draws the current having the first current value ($I_1$) from the first comparison terminal 42, and draws the current having the second current value ($I_2$) from the second comparison terminal 44.

In the example of FIG. 7, $I_{P\_i}=I_1$ and $I_{N\_i}=I_2$, and the current difference ($I_{P\_i}-I_{N\_i}$) has a positive value. Thus, in the case of $x_i=-1$ and $w_i=-1$, the arithmetic unit 20 can derive +1 as the value ($w_i \cdot x_i$) obtained by multiplying the ith coefficient ($w_i$) by the ith input signal ($x_i$).

Figure 8:
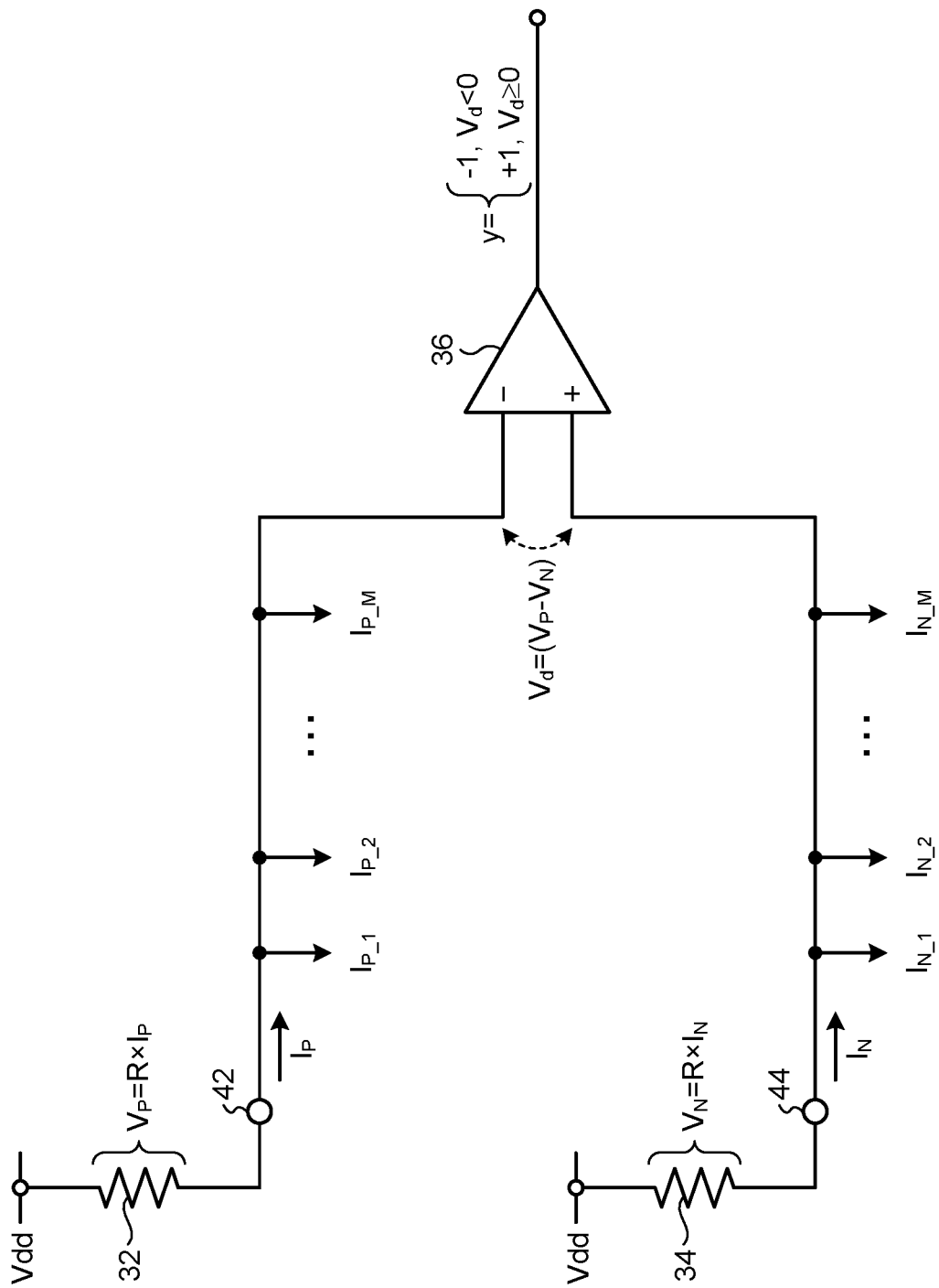
FIG. 8 is an explanatory diagram of the operation of a comparator.

FIG. 8 is a diagram for describing the operation of the comparator 36, and voltage and current of the first resistor 32 and the second resistor 34.

In the present embodiment, the comparator 36 outputs an output signal (y) representing +1 when the differential voltage ($V_d$) obtained by subtracting the negative-side voltage ($V_N$) generated at the second resistor 34 from the positive-side voltage ($V_P$) generated at the first resistor 32 is equal to or larger than zero. On the other hand, in the present embodiment, the comparator 36 outputs an output signal (y) representing −1 when the differential voltage ($V_d$) is smaller than zero.

The resistance value of the first resistor 32 and the second resistor 34 is denoted by R. In this case, the positive-side voltage ($V_P$) is obtained by multiplying R by a positive-side current ($I_P$). The negative-side voltage ($V_N$) is obtained by multiplying R by a negative-side current ($I_N$).

Thus, the differential voltage ($V_d$) can be represented by the following Formula (21).

$$V_d = V_P - V_N = R \times (I_P - I_N) \quad (21)$$

The positive-side current ($I_P$) is current flowing through the first comparison terminal 42. That is, the positive-side current ($I_P$) is a total value of current flowing through the positive input terminals 52 of the M cross switches 38. Thus, the positive-side current ($I_P$) is ($I_{P\_1}+I_{P\_2}+ \ldots +I_{P\_M}$).

The negative-side current ($I_N$) is current flowing through the second comparison terminal 44. That is, the negative-side current ($I_N$) is a total value of current flowing through the negative input terminals 54 of the M cross switches 38. Thus, the negative-side current ($I_N$) is ($I_{N\_1}+I_{N\_2}+ \ldots +I_{N\_M}$).

Thus, the differential voltage ($V_d$) is represented by the following Formula (22).

$$V_d = R \times \{(I_{P\_1}+I_{P\_2}+ \ldots +I_{P\_M})-(I_{N\_1}+I_{N\_2}+ \ldots +I_{N\_M})\} = R \times (I_{P\_1}-I_{N\_1})+ \ldots +(I_{P\_i}-I_{N\_i})+ \ldots +(I_{P\_M}-I_{N\_M})\} \quad (22)$$

Here, as described above with reference to FIGS. 4 to 7, the current difference ($I_{P\_i}-I_{N\_i}$) represents the value ($w_i \cdot x_i$) obtained by multiplying the ith coefficient ($w_i$) by the ith input signal ($x_i$).

Thus, the differential voltage ($V_d$) can be represented by the following Formula (23).

$$V_d \propto \{(w_1 \cdot x_1)+ \ldots +(w_i \cdot x_i)+ \ldots +(w_M \cdot x_M)\} \quad (23)$$

The right side of Formula (23) represents a product-sum (multiply-accumulate) value of the M input signals and the M coefficients.

As described above, the differential voltage ($V_d$) is proportional to the product-sum (multiply-accumulate) value of the M input signals and the M coefficients. The output signal (y) is a binary signal representing whether the differential voltage ($V_d$) is smaller than zero or equal to or larger than zero. Thus, the output signal (y) represents whether the product-sum (multiply-accumulate) value of the M input signals and the M coefficients is smaller than zero or equal to or larger than zero.

As described above, the arithmetic unit 20 according to the present embodiment can execute the product-sum (multiply-accumulate) operation of the M input signals and the M coefficients by analog processing. The arithmetic device 10 can perform sign function processing on a signal corresponding to the multiply-accumulate value to generate an output signal. The arithmetic device 10 as described above can improve the linearity of the product-sum operation of the M input signals and the M coefficient by analog processing. As a result, the arithmetic device 10 can improve the accuracy of an operation that simulates neurons. Further, the arithmetic device 10 as described above achieves high accuracy of an operation that simulates neurons with a simple circuit configuration.

Configuration Example of Constant Current Sources

Hereinafter, a configuration example of the constant current sources will be described.

Figure 9:
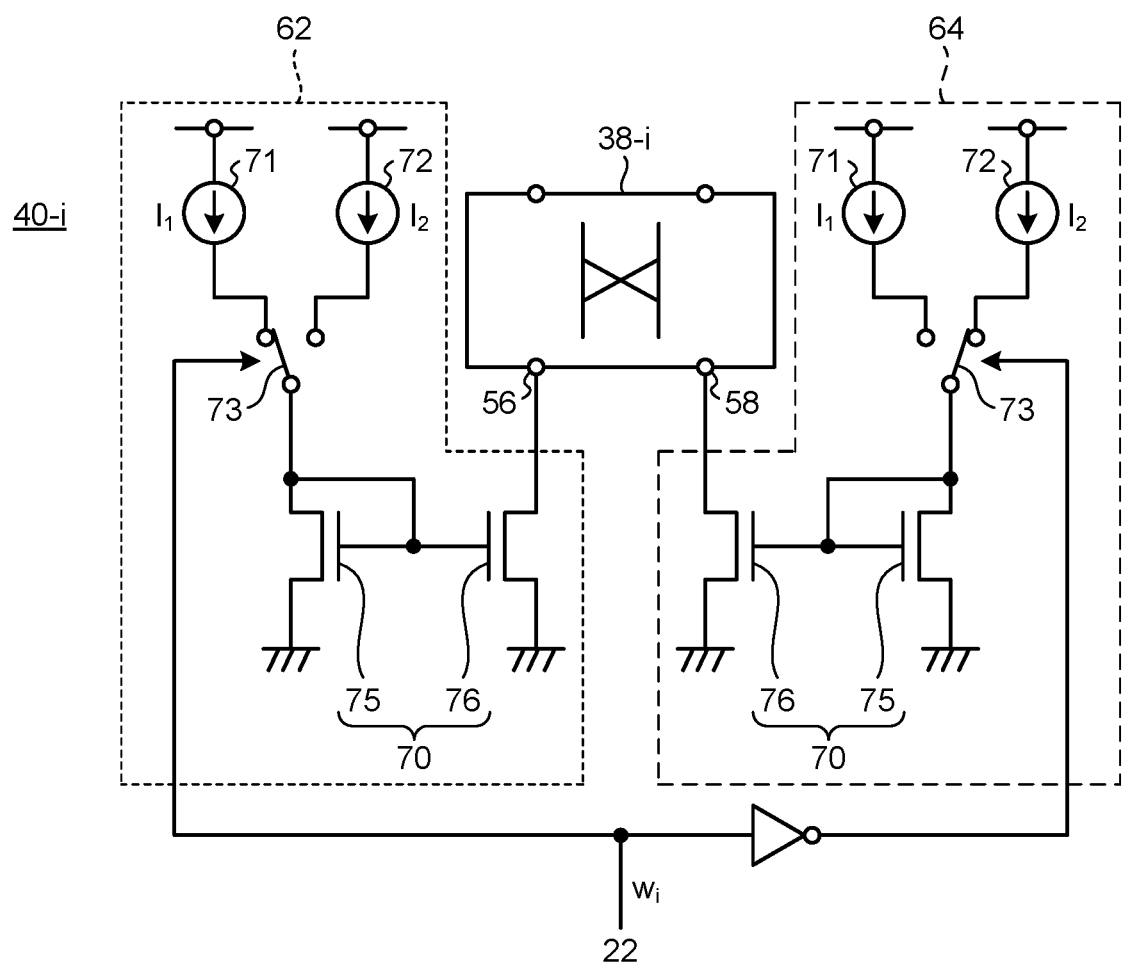
FIG. 9 is a diagram illustrating the configuration of a first constant current source and a second constant current source according to a first example.

FIG. 9 is a diagram illustrating the configuration of a first constant current source 62 and a second constant current source 64 according to a first example together with the cross switch 38.

Each of the first constant current source 62 and the second constant current source 64 according to the first example, for example, includes a current mirror circuit 70, a first current source 71, a second current source 72, and a current selector switch 73.

The current mirror circuit 70 includes a first transistor 75 and a second transistor 76. In the present embodiment, the first transistor 75 and the second transistor 76 are metal-oxide-semiconductor field-effect transistors (MOSFETs). The first transistor 75 and the second transistor 76 may be bipolar transistors.

The first transistor 75 sends a reference current in the current mirror between a drain and a source. The second transistor 76 sends an output current in the current mirror between a drain and a source. The output current is a current that copies the reference current. The drain and a gate of the first transistor 75 are short-circuited. The source of the first transistor 75 is connected to a reference potential (e.g., ground).

A gate of the second transistor 76 is connected to the gate of the first transistor 75. The drain of the second transistor 76 is connected to the positive output terminal 56 or the negative output terminal 58 of the cross switch 38. The source of the second transistor 76 is connected to the reference potential (e.g., ground).

The current mirror circuit 70 as described above can flow the same current as the current flowing between the drain and the source of the first transistor 75 between the drain and the source of the second transistor 76.

The first current source 71 is a current source that sends the current having the first current value ($I_1$). The second current source 72 is a current source that sends the current having the second current value ($I_2$).

The current selector switch 73 connects either the first current source 71 or the second current source 72 to the drain of the first transistor 75 of the current mirror circuit 70 according to the corresponding coefficient ($w_i$). This changes the reference current of the current mirror circuit 70 according to the corresponding coefficient ($w_i$).

When the current selector switch 73 connects the first current source 71 to the first transistor 75, the current having the first current value ($I_1$) flows between the drain and the source of the second transistor 76. Thus, when the current selector switch 73 connects the first current source 71 to the first transistor 75, the current mirror circuit 70 can draw the current having the first current value ($I_1$) from the positive output terminal 56 or the negative output terminal 58 of the cross switch 38.

When the current selector switch 73 connects the second current source 72 to the first transistor 75, the current having the second current value ($I_2$) flows between the drain and the source of the second transistor 76. Thus, when the current selector switch 73 connects the second current source 72 to the first transistor 75, the current mirror circuit 70 can draw the current having the second current value ($I_2$) from the positive output terminal 56 or the negative output terminal 58 of the cross switch 38.

Further, the current selector switch 73 of the first constant current source 62 and the current selector switch 73 of the second constant current source 64 inversely operate. More specifically, when the current selector switch 73 of the first constant current source 62 connects the first current source 71 to the first transistor 75, the current selector switch 73 of the second constant current source 64 connects the second current source 72 to the first transistor 75. Further, when the current selector switch 73 of the first constant current source 62 connects the second current source 72 to the first transistor 75, the current selector switch 73 of the second constant current source 64 connects the first current source 71 to the first transistor 75.

Thus, when the first constant current source 62 draws the current having the first current value ($I_1$) from the positive output terminal 56 of the cross switch 38, the second constant current source 64 draws the current having the second current value ($I_2$) from the negative output terminal 58 of the cross switch 38. Further, when the first constant current source 62 draws the current having the second current value ($I_2$) from the positive output terminal 56 of the cross switch 38, the second constant current source 64 draws the current having the first current value ($I_1$) from the negative output terminal 58 of the cross switch 38.

The first constant current source 62 and the second constant current source 64 according to the first example having such a configuration can switch between the first state in which the first constant current source 62 sends the current having the first current value ($I_1$) and the second constant current source 64 sends the current having the second current value ($I_2$) and the second state in which the first constant current source 62 sends the current having the second current value ($I_2$) and the second constant current source 64 sends the current having the first current value ($I_1$) according to the corresponding coefficient ($w_i$).

Figure 10:
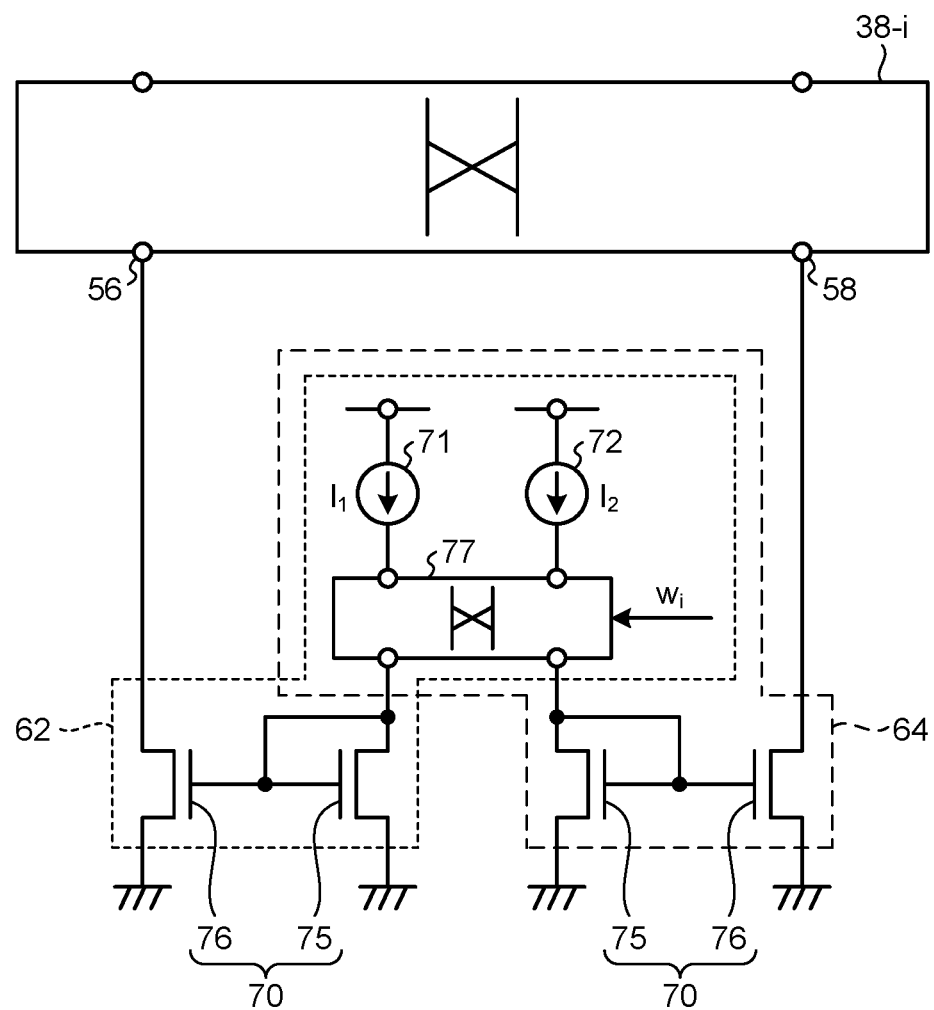
FIG. 10 is a diagram illustrating the configuration of a first constant current source and a second constant current source according to a second example.

FIG. 10 is a diagram illustrating the configuration of a first constant current source 62 and a second constant current source 64 according to a second example together with the cross switch 38.

Each of the first constant current source 62 and the second constant current source 64 according to the second example includes a current mirror circuit 70, a first current source 71, a second current source 72, and a common cross switch 77. Note that, in the second example, the first current source 71, the second current source 72, and the common cross switch 77 are shared between the first constant current source 62 and the second constant current source 64.

The current mirror circuit 70 has the same configuration as the configuration in the first example illustrated in FIG. 9. The first current source 71 and the second current source 72 have the same configuration as the configuration in the first example illustrated in FIG. 9.

The common cross switch 77 switches between a first switching state and a second switching state according to the corresponding coefficient ($w_i$). The first switching state is a state in which the first current source 71 is connected to the first transistor 75 of the first constant current source 62 and the second current source 72 is connected to the first transistor 75 of the second constant current source 64. The second switching state is a state in which the first current source 71 is connected to the first transistor 75 of the second constant current source 64 and the second current source 72 is connected to the first transistor 75 of the first constant current source 62.

The first constant current source 62 and the second constant current source 64 according to the second example having such a configuration can switch between the first state in which the first constant current source 62 sends the current having the first current value ($I_1$) and the second constant current source 64 sends the current having the second current value ($I_2$) and the second state in which the first constant current source 62 sends the current having the second current value ($I_2$) and the second constant current source 64 sends the current having the first current value ($I_1$) according to the corresponding coefficient ($w_i$).

Figure 11:
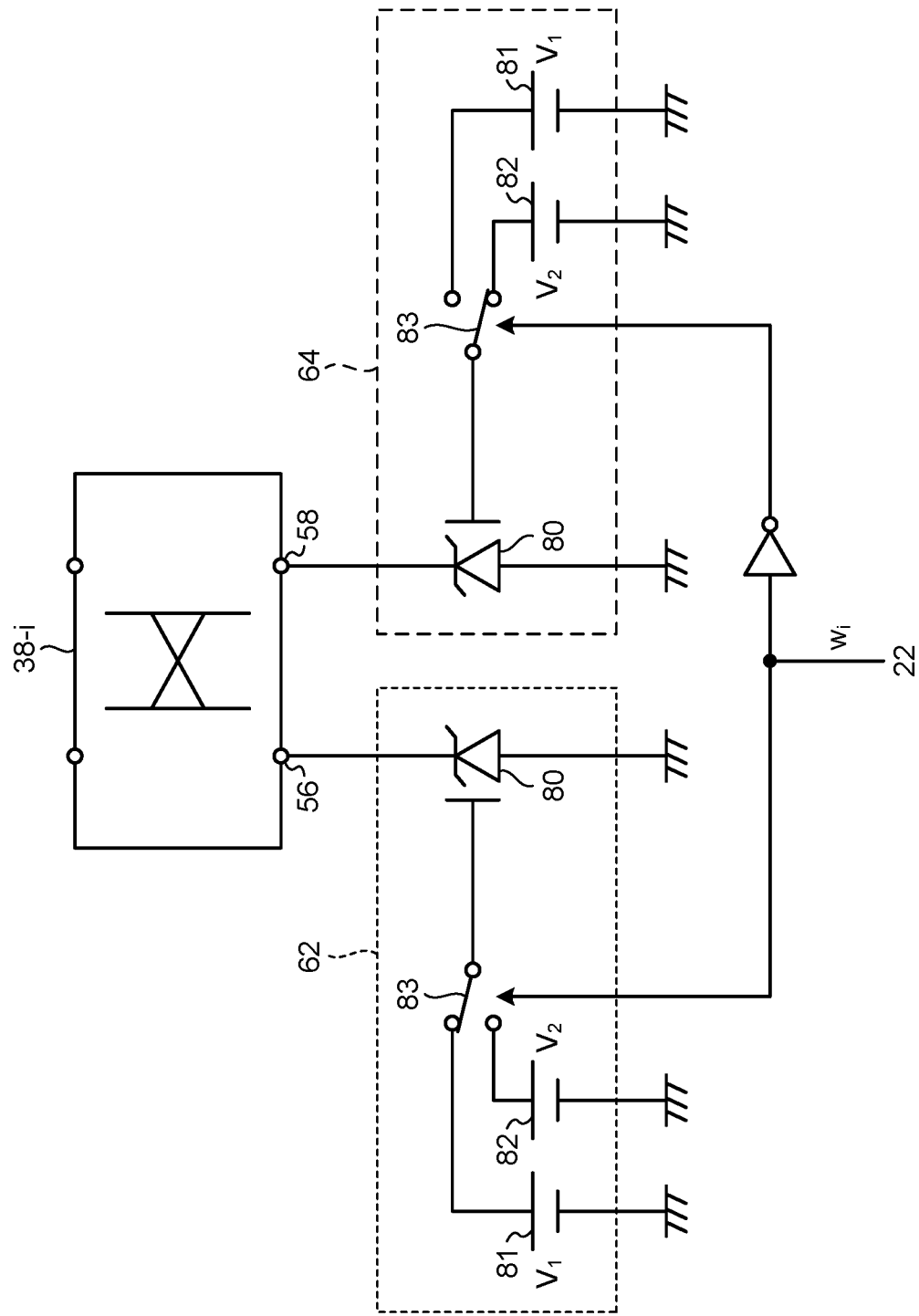
FIG. 11 is a diagram illustrating the configuration of a first constant current source and a second constant current source according to a third example.
Figure 12:
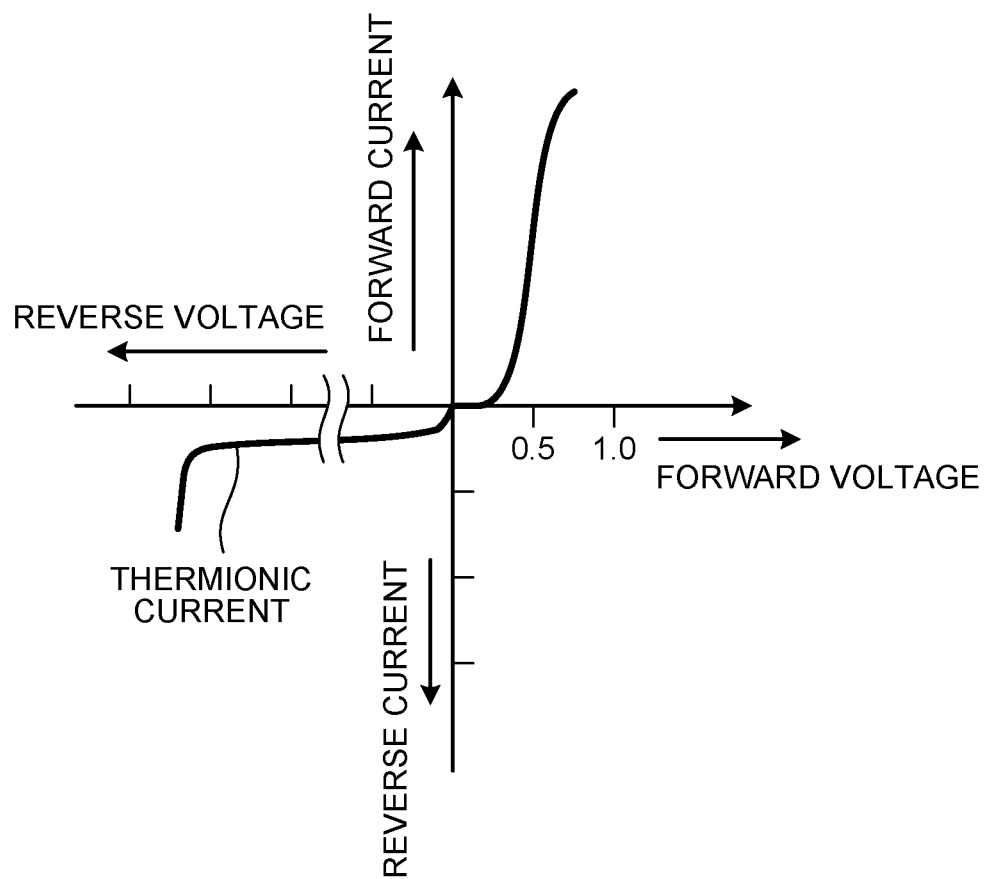
FIG. 12 is a diagram illustrating a voltage-current characteristic of a Schottky barrier diode.

FIG. 11 is a diagram illustrating the configuration of a first constant current source 62 and a second constant current source 64 according to a third example together with the cross switch 38. FIG. 12 is a diagram illustrating a voltage-current characteristic of a Schottky barrier diode 80.

Each of the first constant current source 62 and the second constant current source 64 according to the third example, for example, includes the Schottky barrier diode 80, a first voltage source 81, a second voltage source 82, and a voltage selector switch 83.

The Schottky barrier diode 80 is a diode using a Schottky barrier which is generated by the junction of metal and semiconductor. The Schottky barrier diode 80 included in the first constant current source 62 is connected between the positive output terminal 56 of the cross switch 38 and a reference potential (e.g., ground) so that a reverse bias is applied thereto. The Schottky barrier diode 80 included in the second constant current source 64 is connected between the negative output terminal 58 of the cross switch 38 and the reference potential (e.g., ground) so that a reverse bias is applied thereto. For example, when the power supply voltage (Vdd) is higher than the reference potential, a cathode of the Schottky barrier diode 80 is connected to the positive output terminal 56 or the negative output terminal 58, and an anode thereof is connected to the reference potential.

The Schottky barrier diode 80, for example, has the voltage-current characteristic as illustrated in FIG. 12. The Schottky barrier diode 80 can send thermionic current from the cathode to the anode by the reverse bias applied thereto. In the Schottky barrier diode 80, a leakage current flowing in the reverse direction is relatively larger than that of a PN junction diode, but a change in the leakage current with respect to a reverse voltage is relatively smaller than that of the PN junction diode. Thus, the Schottky barrier diode 80 can send a relatively small constant current by connecting the Schottky barrier diode 80 so that the reverse bias is applied thereto. In other words, the Schottky barrier diode 80 can be used as a constant current source that sends a low current by connecting the Schottky barrier diode 80 so that the reverse bias is applied thereto.

Furthermore, in the present embodiment, the Schottky barrier diode 80 includes a gate terminal. The gate terminal is a terminal for applying a back bias voltage to a substrate. In the Schottky barrier diode 80, the magnitude of the leakage current varies according to the height of the Schottky barrier between the metal and the semiconductor. In the Schottky barrier diode 80, the height of the Schottky barrier varies according to a change in the back bias voltage applied to the gate terminal. Thus, when the Schottky barrier diode 80 is used as the constant current source by connecting the Schottky barrier diode 80 so that the reverse bias is applied thereto, the Schottky barrier diode 80 can change the amount of flowing current according to the change in the back bias voltage.

The first voltage source 81 is a voltage source that generates a voltage having a first voltage value ($V_1$). The second voltage source 82 is a current source that generates a voltage having a second voltage value ($V_2$) which is different from the first voltage value ($V_1$).

The voltage selector switch 83 connects either the first voltage source 81 or the second voltage source 82 to the gate terminal of the Schottky barrier diode 80 according to the corresponding coefficient ($w_i$).

When the voltage having the first voltage value ($V_1$) is applied to the gate terminal by connecting the first voltage source 81 to the gate terminal by the voltage selector switch 83, the Schottky barrier diode 80 sends the current having the first current value ($I_1$). Thus, when the voltage having the first voltage value ($V_1$) is applied to the gate terminal, the Schottky barrier diode 80 can draw the current having the first current value ($I_1$) from the positive output terminal 56 or the negative output terminal 58 of the cross switch 38.

When the voltage having the second voltage value ($V_2$) is applied to the gate terminal by connecting the second voltage source 82 to the gate terminal by the voltage selector switch 83, the Schottky barrier diode 80 sends the current having the second current value ($I_2$). Thus, when the voltage having the second voltage value ($V_2$) is applied to the gate terminal, the Schottky barrier diode 80 can draw the current having the second current value ($I_2$) from the positive output terminal 56 or the negative output terminal 58 of the cross switch 38.

Furthermore, the voltage selector switch 83 of the first constant current source 62 and the voltage selector switch 83 of the second constant current source 64 inversely operate. More specifically, when the voltage selector switch 83 of the first constant current source 62 connects the first voltage source 81 to the gate terminal of the Schottky barrier diode 80, the voltage selector switch 83 of the second constant current source 64 connects the second voltage source 82 to the gate terminal of the Schottky barrier diode 80. Furthermore, when the voltage selector switch 83 of the first constant current source 62 connects the second voltage source 82 to the gate terminal of the Schottky barrier diode 80, the voltage selector switch 83 of the second constant current source 64 connects the first voltage source 81 to the gate terminal of the Schottky barrier diode 80.

Thus, when the first constant current source 62 draws the current having the first current value ($I_1$) from the positive output terminal 56 of the cross switch 38, the second constant current source 64 draws the current having the second current value ($I_2$) from the negative output terminal 58 of the cross switch 38. Furthermore, when the first constant current source 62 draws the current having the second current value ($I_2$) from the positive output terminal 56 of the cross switch 38, the second constant current source 64 draws the current having the first current value ($I_1$) from the negative output terminal 58 of the cross switch 38.

The first constant current source 62 and the second constant current source 64 according to the third example having such a configuration can switch between the first state in which the first constant current source 62 sends the current having the first current value ($I_1$) and the second constant current source 64 sends the current having the second current value ($I_2$) and the second state in which the first constant current source 62 sends the current having the second current value ($I_2$) and the second constant current source 64 sends the current having the first current value ($I_1$) according to the corresponding coefficient ($w_i$).

Figure 13:
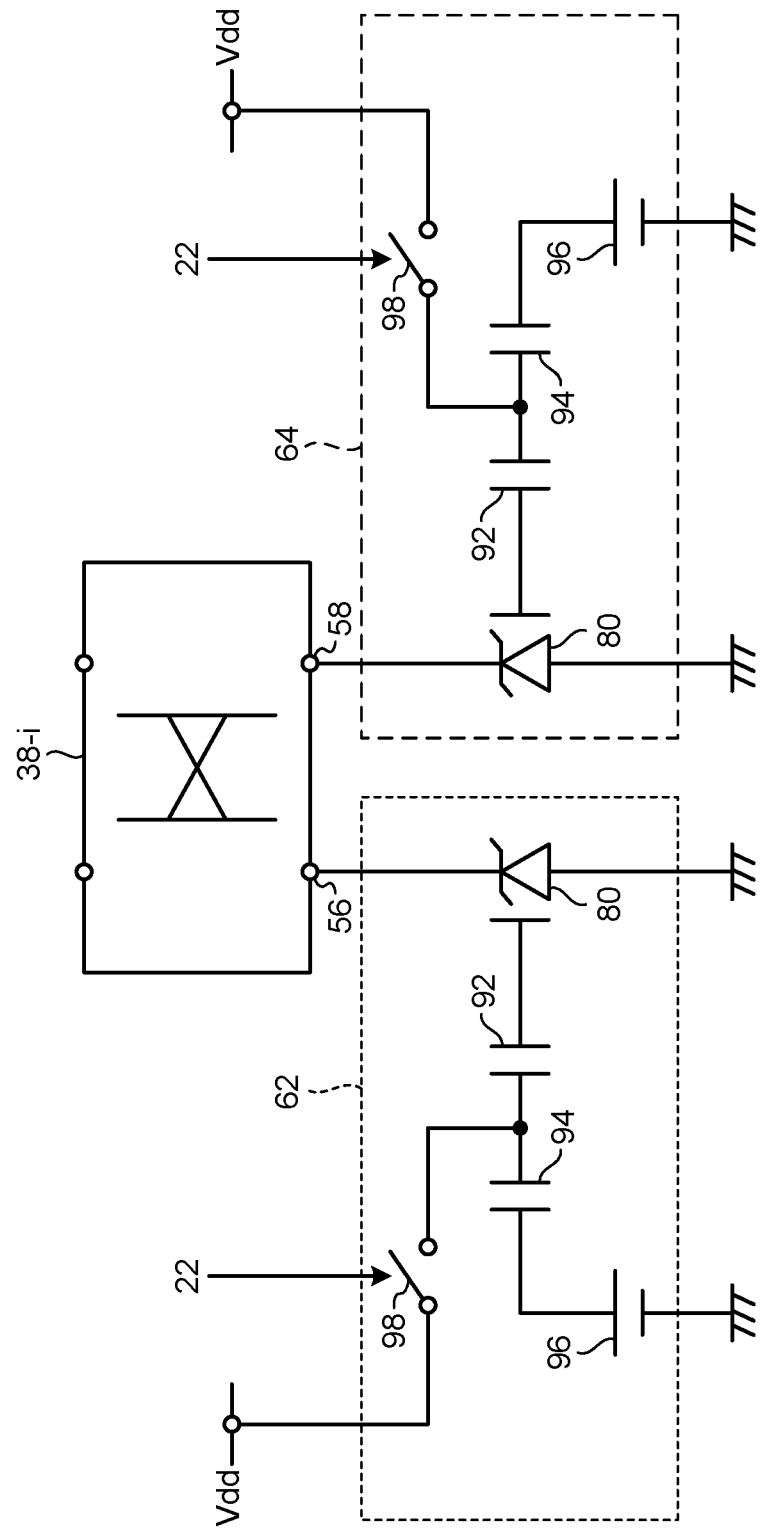
FIG. 13 is a diagram illustrating the configuration of a first constant current source and a second constant current source according to a fourth example.

FIG. 13 is a diagram illustrating the configuration of a first constant current source 62 and a second constant current source 64 according to a fourth example together with the cross switch 38.

Each of the first constant current source 62 and the second constant current source 64 according to the fourth example, for example, includes a Schottky barrier diode 80, a first capacitor 92, a second capacitor 94, a voltage generation source 96, and a switch 98.

One terminal of the first capacitor 92 is connected to a gate terminal of the Schottky barrier diode 80. One terminal of the second capacitor 94 is connected to the other terminal of the first capacitor 92, the other terminal not being connected with the Schottky barrier diode 80, and the other terminal of the second capacitor 94 is connected to the voltage generation source 96. The voltage generation source 96 applies a predetermined voltage to the other terminal of the second capacitor 94, the other terminal not being connected with the first capacitor 92.

The switch 98 turns on or off connection between a contact between the first capacitor 92 and the second capacitor 94 and a power supply voltage (Vdd). When the switch 98 is turned on, the switch 98 can send current from the power supply voltage (Vdd) to the first capacitor 92 and the second capacitor 94, and cause the first capacitor 92 and the second capacitor 94 to hold charges corresponding to an ON period.

When the switch 98 is off, the first capacitor 92 and the second capacitor 94 can continuously hold accumulated charges. The first capacitor 92 and the second capacitor 94 as described above can apply a voltage obtained by adding a voltage generated from the voltage generation source 96 and a voltage corresponding to the accumulated charges to the gate terminal of the Schottky barrier diode 80.

The switch 98 is controlled to turn on or off by the setting unit 22. The setting unit 22 controls the ON period of the switch 98 so that charges corresponding to the corresponding coefficient are accumulated on the first capacitor 92 and the second capacitor 94 prior to reception of M input signals.

More specifically, the setting unit 22 controls the ON period of the switch 98 so that the voltage having the first voltage value ($V_1$) or the voltage having the second voltage value ($V_2$) is applied to the gate terminal according to the corresponding coefficient.

When the voltage having the first voltage value ($V_1$) is applied to the gate terminal by the accumulation of charges on the first capacitor 92 and the second capacitor 94, the Schottky barrier diode 80 sends the current having the first current value ($I_1$). Thus, when the voltage having the first voltage value ($V_1$) is applied to the gate terminal, the Schottky barrier diode 80 can draw the current having the first current value ($I_1$) from the positive output terminal 56 or the negative output terminal 58 of the cross switch 38.

When the voltage having the second voltage value ($V_2$) is applied to the gate terminal by the accumulation of charges on the first capacitor 92 and the second capacitor 94, the Schottky barrier diode 80 sends the current having the second current value ($I_2$). Thus, when the voltage having the second voltage value ($V_2$) is applied to the gate terminal, the Schottky barrier diode 80 can draw the current having the second current value ($I_2$) from the positive output terminal 56 or the negative output terminal 58 of the cross switch 38.

Furthermore, the setting unit 22 controls the switch 98 so that different voltages are applied to the gate terminal of the Schottky barrier diode 80 of the first constant current source 62 and the gate terminal of the Schottky barrier diode 80 of the second constant current source 64. That is, when the voltage having the first voltage value ($V_1$) is applied to the gate terminal of the Schottky barrier diode 80 of the first constant current source 62, the setting unit 22 applies the voltage having the second voltage value ($V_2$) to the gate terminal of the Schottky barrier diode 80 of the second constant current source 64. When the voltage having the second voltage value ($V_2$) is applied to the gate terminal of the Schottky barrier diode 80 of the first constant current source 62, the setting unit 22 applies the voltage having the first voltage value ($V_1$) to the gate terminal of the Schottky barrier diode 80 of the second constant current source 64.

Thus, when the first constant current source 62 draws the current having the first current value ($I_1$) from the positive output terminal 56 of the cross switch 38, the second constant current source 64 draws the current having the second current value ($I_2$) from the negative output terminal 58 of the cross switch 38. When the first constant current source 62 draws the current having the second voltage value ($I_2$) from the positive output terminal 56 of the cross switch 38, the second constant current source 64 draws the current having the first voltage value ($I_1$) from the negative output terminal 58 of the cross switch 38.

The first constant current source 62 and the second constant current source 64 according to the fourth example having such a configuration can switch between the first state in which the first constant current source 62 sends the current having the first current value ($I_1$) and the second constant current source 64 sends the current having the second current value ($I_2$) and the second state in which the first constant current source 62 sends the current having the second voltage value ($I_2$) and the second constant current source 64 sends the current having the first voltage value ($I_1$) according to the corresponding coefficient ($w_i$).

Furthermore, the first capacitor 92 and the second capacitor 94 of each of the first constant current source 62 and the second constant current source 64 according to the fourth example having such a configuration can hold charges even when the power supply voltage is interrupted. Thus, the first constant current source 62 and the second constant current source 64 according to the fourth example having such a configuration can continuously store the coefficients even when the power supply voltage is interrupted.

Second Embodiment

Next, an arithmetic device 10 according to a second embodiment will be described. The arithmetic device 10 according to the second embodiment have substantially the same function and configuration as the arithmetic device 10 according to the first embodiment described above with reference to FIGS. 1 to 13. Thus, in the description of the arithmetic device 10 according to the second embodiment, a circuit or the like having substantially the same function and configuration as those in the first embodiment is denoted by the same reference sign as the first embodiment to omit the description thereof except the difference therebetween. Furthermore, the same applies also to the third embodiment and subsequent embodiments.

Figure 14:
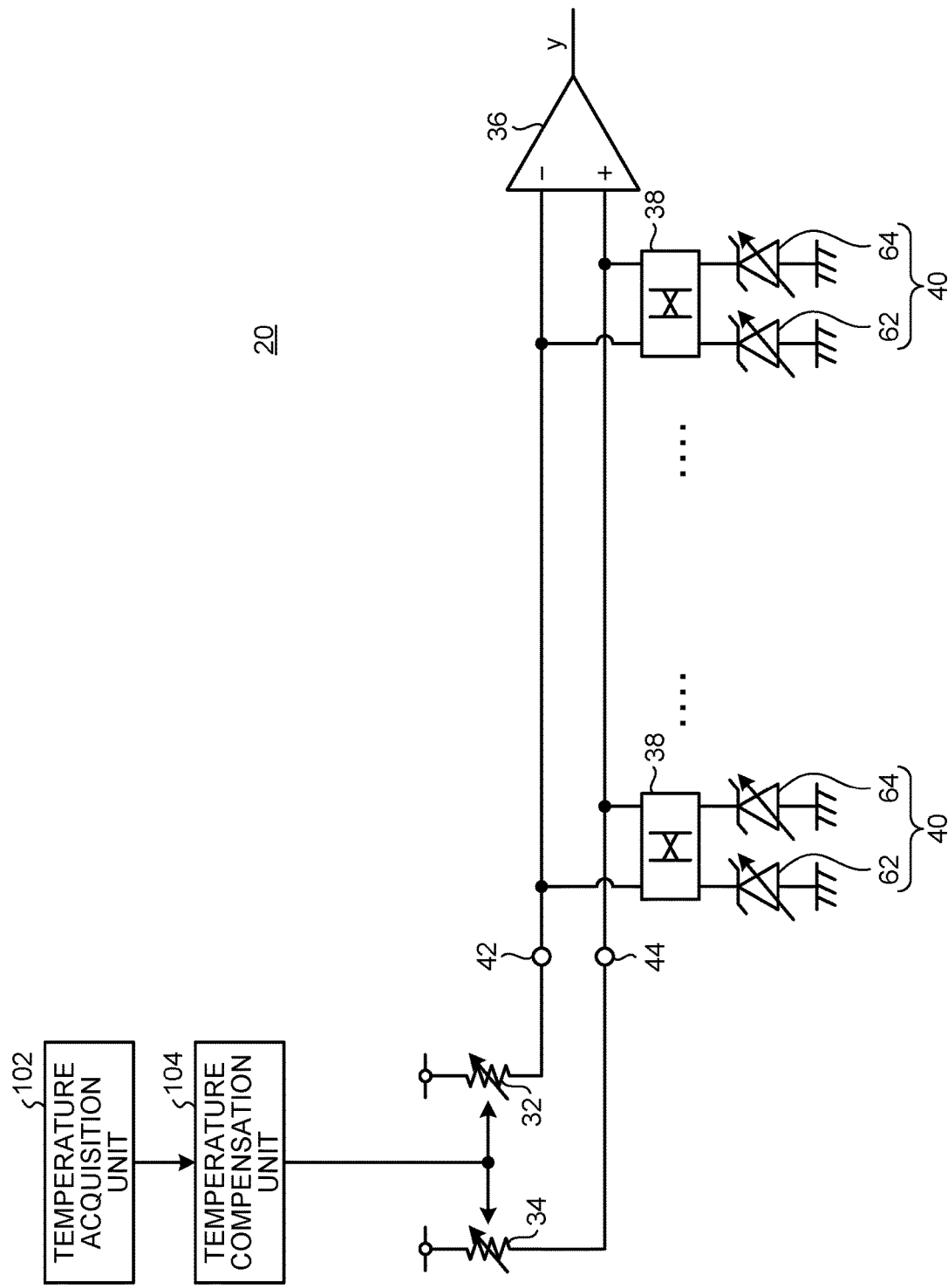
FIG. 14 is a diagram illustrating the configuration of an arithmetic unit according to a second embodiment.

FIG. 14 is a diagram illustrating the configuration of an arithmetic unit 20 according to the second embodiment.

The arithmetic unit 20 according to the second embodiment includes M coefficient circuits 40, each of which includes a first constant current source 62 and a second constant current source 64. Each of the first constant current source 62 and the second constant current source 64 is a current source including a Schottky barrier diode 80. For example, each of the first constant current source 62 and the second constant current source 64 has the configuration illustrated in FIG. 11 or FIG. 13.

The arithmetic unit 20 according to the second embodiment includes a first resistor 32 and a second resistor 34 which are variable resistors. For example, each of the first resistor 32 and the second resistor 34 may be a circuit including a plurality of resistors which are connected in a ladder form, and a plurality of switches which switch the connection of the resistors connected in a ladder form. That is, each of the first resistor 32 and the second resistor 34 may have a configuration of a DA converter including no amplifier. Note that the first resistor 32 and the second resistor 34 are switched to the same resistance value.

The arithmetic unit 20 according to the second embodiment as described above further includes a temperature acquisition unit 102 and a temperature compensation unit 104.

The temperature acquisition unit 102 acquires the temperature of the Schottky barrier diode 80 of each of the first constant current source 62 and the second constant current source 64. The temperature acquisition unit 102 may acquire the temperature of another part correlated with the temperature of each of the first constant current source 62 and the second constant current source 64 instead of the temperature of the Schottky barrier diode 80. For example, the temperature acquisition unit 102 may acquire the temperature of a substrate of each of the first constant current source 62 and the second constant current source 64 or may acquire the temperature of gas around the arithmetic unit 20.

The temperature compensation unit 104 changes the resistance value of the first resistor 32 and the second resistor 34 according to the acquired temperature so that a maximum value or a minimum value of the first voltage ($V_1$) and the second voltage ($V_2$) falls within a set range. That is, the temperature compensation unit 104 changes the resistance value of the first resistor 32 and the second resistor 34 so that a voltage applied to each of a minus-side input terminal and a plus-side input terminal of the comparator 36 falls within a set range. For example, the temperature compensation unit 104 changes the resistance value of the first resistor 32 and the second resistor 34 so that the voltage applied to each of the minus-side input terminal and the plus-side input terminal of the comparator 36 becomes larger than a lower limit applicable to the comparator 36 and smaller than an upper limit applicable to the comparator 36.

Figure 15:
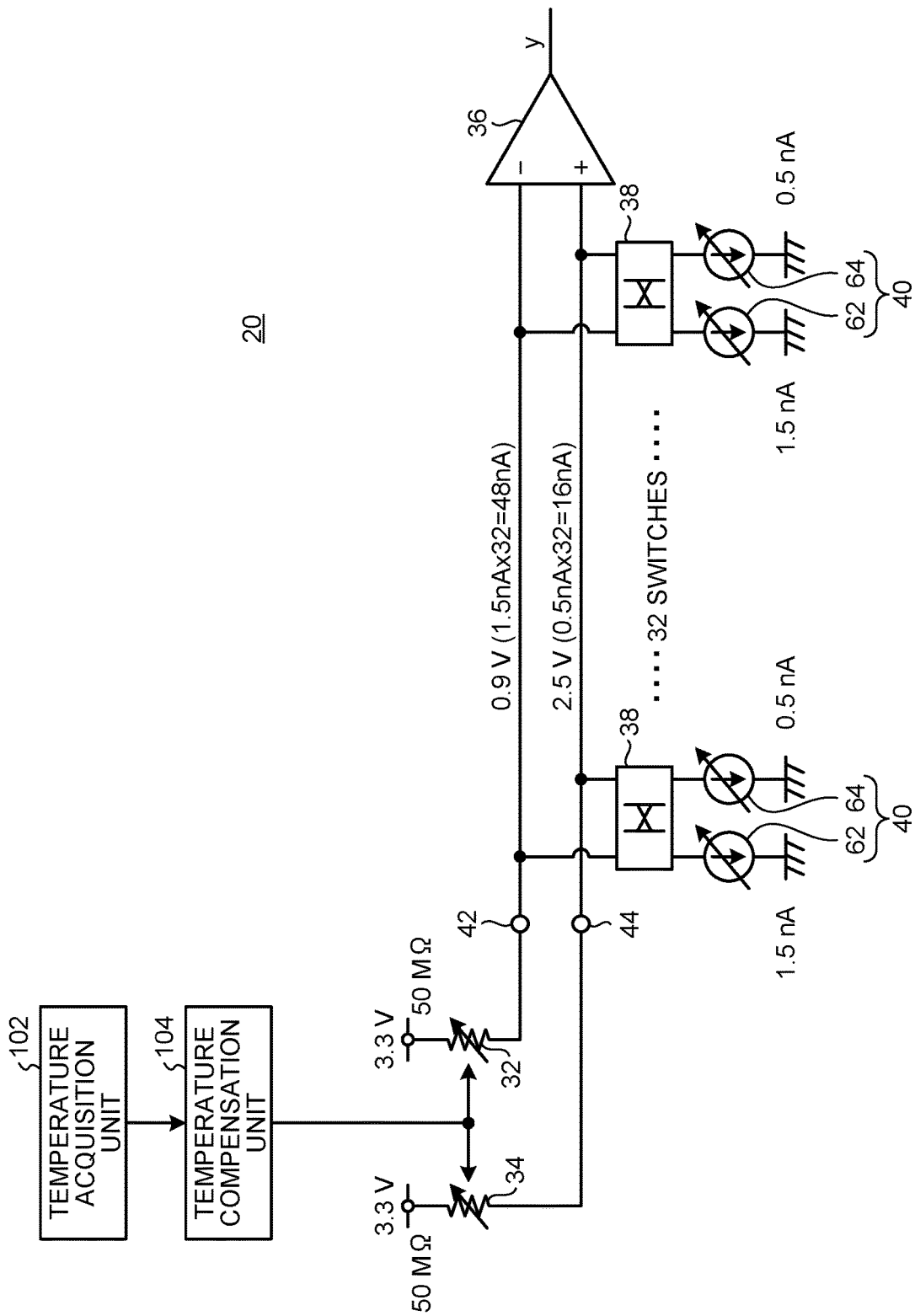
FIG. 15 is a diagram illustrating an example of a parameter in the case of 25° C.

FIG. 15 is a diagram illustrating an example of a parameter when the temperature is 25° C., M=32, and the power supply voltage (Vdd) is 3.3 V. When the substrate temperature is 25° C., for example, the first constant current source 62 and the second constant current source 64 send a current of 1.5 nA as the first current value ($I_1$), and send a current of 0.5 nA as the second current value ($I_2$).

When the temperature is 25° C. as described above, the temperature compensation unit 104, for example, sets the first resistor 32 and the second resistor 34 to a resistance value of 50 MΩ.

When the temperature is 25° C., the maximum value of current flowing through the first comparison terminal 42 and the second comparison terminal 44 is 48 nA (=1.5 nA×32). Further, the minimum value of current flowing through the first comparison terminal 42 and the second comparison terminal 44 is 16 nA (=0.5 nA×32).

Thus, the maximum value of the first voltage ($V_1$) generated at the first comparison terminal 42 and the second voltage ($V_2$) generated at the second comparison terminal 44 is 2.5 V (=3.3 V−(50 MΩ×16 nA)). Further, the minimum value of the first voltage ($V_1$) generated at the first comparison terminal 42 and the second voltage ($V_2$) generated at the second comparison terminal 44 is 0.9 V (=3.3 V−(50 MΩ×48 nA)).

The temperature compensation unit 104 can set the maximum value of the first voltage ($V_1$) and the second voltage ($V_2$) to 2.5 V and the minimum value of the first voltage ($V_1$) and the second voltage ($V_2$) to 0.9 V by setting the first resistor 32 and the second resistor 34 to the resistance value of 50 MΩ when the temperature is 25° C.

Figure 16:
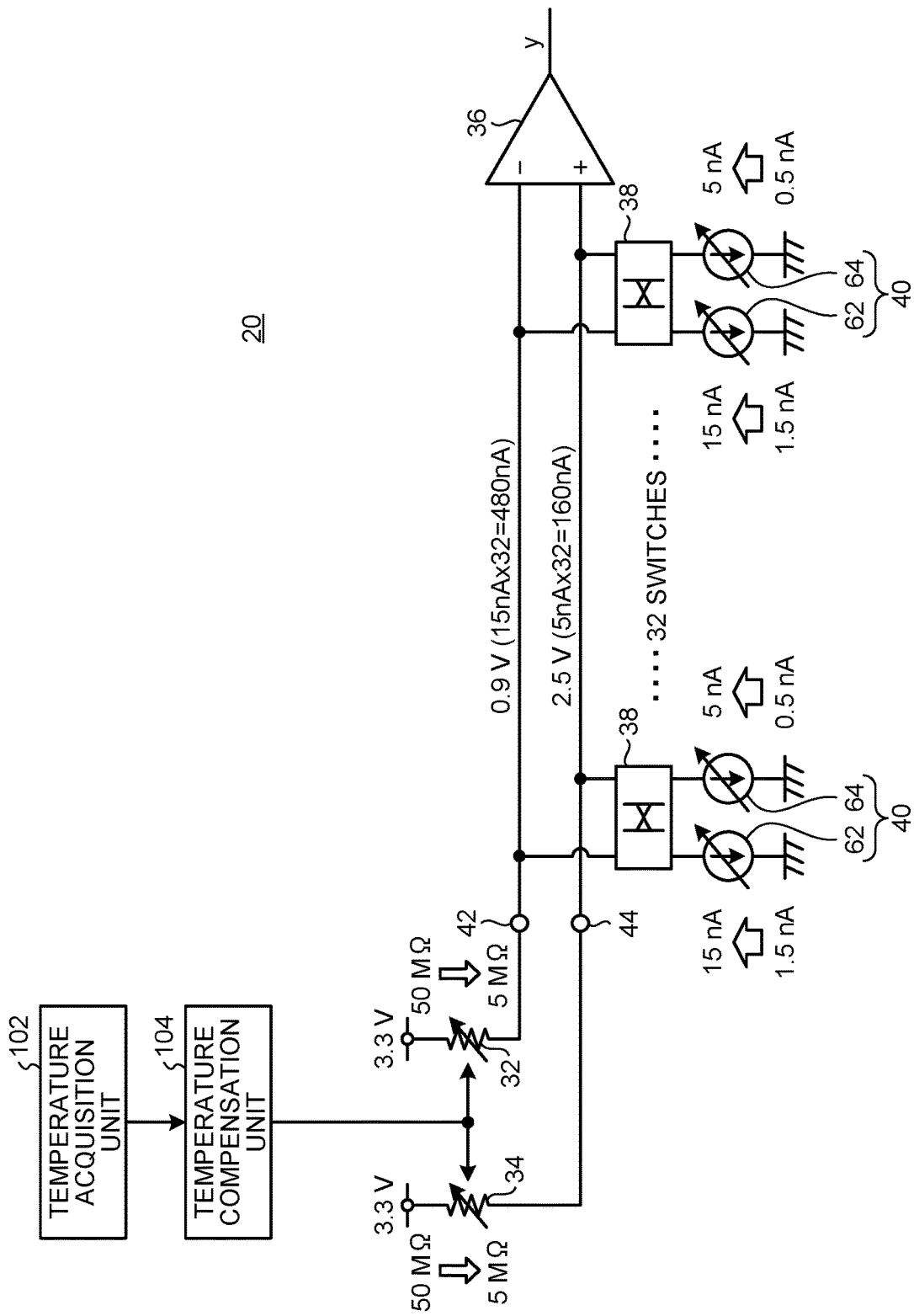
FIG. 16 is a diagram illustrating an example of a parameter in the case of 75° C.

FIG. 16 is a diagram illustrating an example of the parameter when the temperature is 75° C., M=32, and the power supply voltage (Vdd) is 3.3 V. When the temperature is 75° C., for example, the first constant current source 62 and the second constant current source 64 send a current of 15 nA as the first current value ($I_1$), and send a current of 5 nA as the second current value ($I_2$).

When the temperature is 75° C. as described above, the temperature compensation unit 104, for example, sets the first resistor 32 and the second resistor 34 to a resistance value of 5 MΩ.

When the temperature is 75° C., the maximum value of current flowing through the first comparison terminal 42 and the second comparison terminal 44 is 480 nA (=15 nA×32). Further, the minimum value of current flowing through the first comparison terminal 42 and the second comparison terminal 44 is 160 nA (=5 nA×32).

Thus, the maximum value of the first voltage ($V_1$) generated at the first comparison terminal 42 and the second voltage ($V_2$) generated at the second comparison terminal 44 is 2.5 V (=3.3 V−(5 MΩ×160 nA)). Further, the minimum value of the first voltage ($V_1$) generated at the first comparison terminal 42 and the second voltage ($V_2$) generated at the second comparison terminal 44 is 0.9 V (=3.3 V−(5 MΩ×480 nA)).

The temperature compensation unit 104 can set the maximum value of the first voltage ($V_1$) and the second voltage ($V_2$) to 2.5 V and the minimum value of the first voltage ($V_1$) and the second voltage ($V_2$) to 0.9 V by setting the first resistor 32 and the second resistor 34 to the resistance value of 5 MΩ when the temperature is 75° C.

In this manner, the temperature compensation unit 104 changes the resistance value of the first resistor 32 and the second resistor 34 according to the temperature. Accordingly, it is possible to adjust the first voltage ($V_1$) and the second voltage ($V_2$) within the range of voltage applicable to the comparator 36.

For example, the temperature compensation unit 104 may store a previously calculated correspondence relationship between the temperature and the resistance value of the first resistor 32 and the second resistor 34. For example, the temperature compensation unit 104 may previously store a table or an arithmetic expression representing the resistance value with respect to the temperature. This enables the temperature compensation unit 104 to change the resistance value of the first resistor 32 and the second resistor 34 so that the maximum value or the minimum value of the first voltage ($V_1$) and the second voltage ($V_2$) falls within the set range.

The relationship of the resistance value with the temperature can be calculated, for example, on the basis of the Richardson-Dushman formula of the following Formula (30) at the stage of designing or manufacturing the first constant current source 62 and the second constant current source 64. Formula (30) represents a leakage current ($I_S$) in the reverse direction in Schottky junction.

$$I_S = SA^{**}T^2 \exp\left(-\frac{q\varphi_B}{kT}\right) \tag{30}$$

S denotes the area of the Schottky junction, $A^{}$ denotes the Richardson constant, and $A^{}=4\ \pi m k^2 q/h^3$.

Further, T denotes the temperature, k denotes the Boltzmann constant, h denotes the Plank's constant, m denotes the mass of electron, and q denotes an elementary charge.

Further, $q\phi_B$ denotes the height of the Schottky barrier per electron. Thus, in the Schottky barrier diode 80, electrons having a thermal energy of equal to or higher than $q\phi_B$ move over the Schottky barrier and flow as the leakage current.

The temperature compensation unit 104, for example, switches the resistance value of the first resistor 32 and the second resistor 34 on the basis of a table or an arithmetic expression created by the designer or the like in accordance with Formula (30).

The arithmetic device 10 according to the second embodiment having such a configuration can execute the product-sum operation with high accuracy regardless of the temperature of the first constant current source 62 and the second constant current source 64.

Third Embodiment

Next, an arithmetic device 10 according to a third embodiment will be described.

Figure 17:
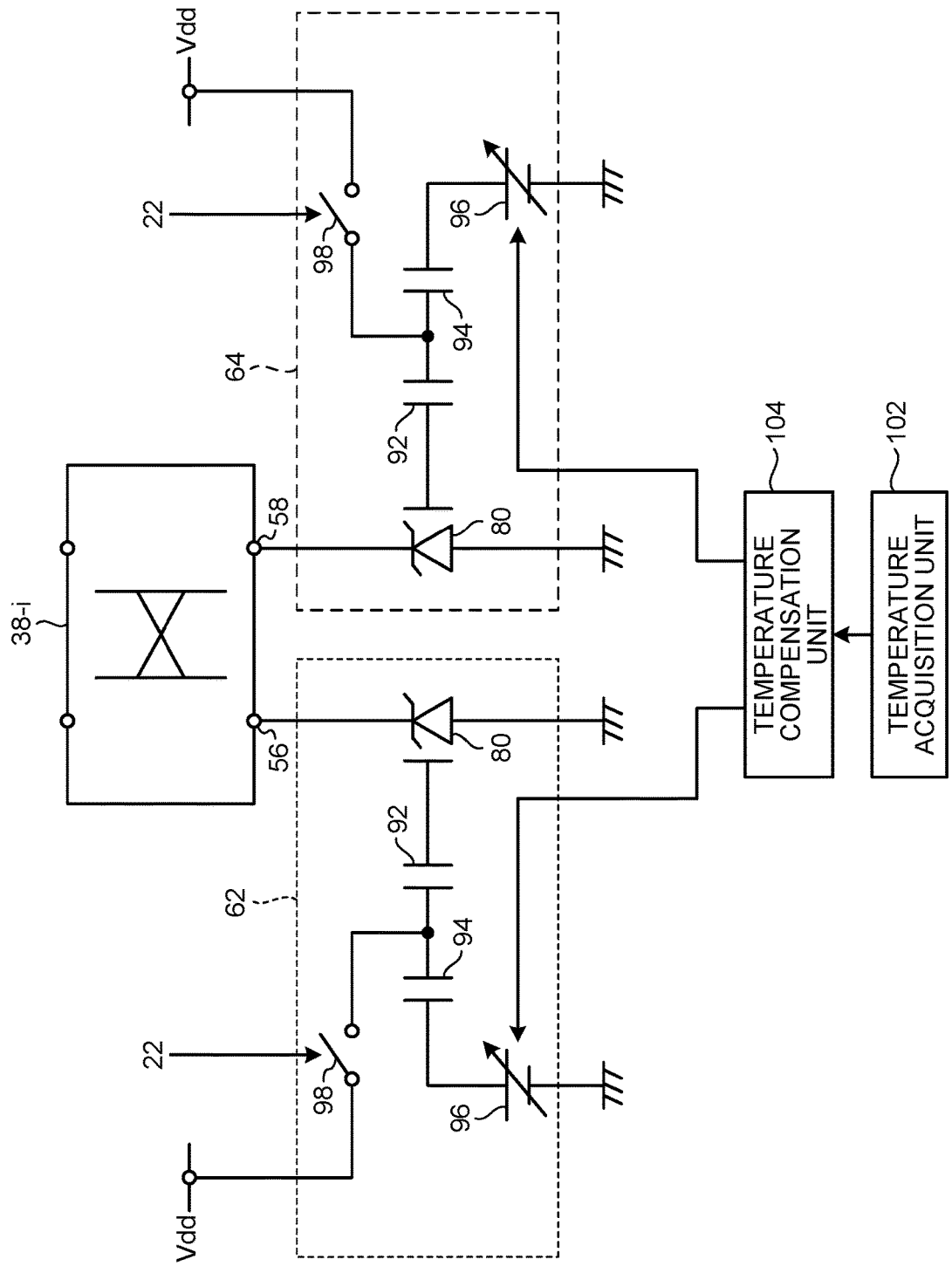
FIG. 17 is a diagram illustrating the configuration of constant current sources according to a third embodiment.

FIG. 17 is a diagram illustrating the configuration of a first constant current source 62 and a second constant current source 64 according to the third embodiment together with a cross switch 38.

Each of the first constant current source 62 and the second constant current source 64 included in each of M coefficient circuits 40 according to the third embodiment is a current source including a Schottky barrier diode 80. For example, each of the first constant current source 62 and the second constant current source 64 has the configuration illustrated in FIG. 11 or FIG. 13.

Each of the first constant current source 62 and the second constant current source 64 according to the third embodiment is capable of changing a back bias voltage in accordance with control from the outside. For example, in the case where each of the first constant current source 62 and the second constant current source 64 has the configuration illustrated in FIG. 13, the voltage generation source 96 is a variable voltage source capable of changing voltage to be generated in accordance with control from the outside. For example, the voltage generation source 96 may be a DA converter. Note that, in the case where each of the first constant current source 62 and the second constant current source 64 has the configuration illustrated in FIG. 11, the first voltage source 81 and the second voltage source 82 are variable voltage sources.

An arithmetic unit 20 according to the third embodiment further includes a temperature acquisition unit 102 and a temperature compensation unit 104.

The temperature acquisition unit 102 has a configuration similar to that of the second embodiment.

The temperature compensation unit 104 changes the back bias voltage according to the acquired temperature so that each of the first current value ($I_1$) and the second current value ($I_2$) of current flowing through the first constant current source 62 and the second constant current source 64, which are included in each of the M coefficient circuits 40, falls within a set range.

That is, when the first constant current source 62 and the second constant current source 64 are set to send the current having the first current value ($I_1$), the temperature compensation unit 104 changes the back bias voltage so that a leakage current flowing through the Schottky barrier diode 80 has a value that falls within a range of a predetermined margin from the first current value ($I_1$).

When the first constant current source 62 and the second constant current source 64 are set to send the current having the second current value ($I_2$), the temperature compensation unit 104 changes the back bias voltage so that the leakage current flowing through the Schottky barrier diode 80 has a value that falls within the range of the predetermined margin from the second current value ($I_2$).

For example, the temperature compensation unit 104 may store a previously calculated correspondence relationship between the temperature and the back bias voltage. For example, the temperature compensation unit 104 may previously store a table or an arithmetic expression representing the back bias voltage with respect to the temperature. This enables the temperature compensation unit 104 to change the back bias voltage so that each of the first current value ($I_1$) and the second current value ($I_2$) of current flowing through the first constant current source 62 and the second constant current source 64 falls within the set range.

The relationship of the back bias voltage with the temperature can be calculated, for example, on the basis of the following Formula (31), which is a modification of the Richardson-Dushman formula, at the stage of designing or manufacturing the first constant current source 62 and the second constant current source 64. Formula (31) is a modification of the above Formula (30).

$$-kT * ln\left(\frac{I_S}{SA^{**}T^2}\right) = q\varphi_B \tag{31}$$

The temperature compensation unit 104, for example, switches the resistance value of the first resistor 32 and the second resistor 34 on the basis of a table or an arithmetic expression created by the designer or the like in accordance with Formula (31).

The arithmetic device 10 according to the third embodiment having such a configuration can execute the product-sum operation with high accuracy regardless of the temperature of the first constant current source 62 and the second constant current source 64.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic device configured to receive M input signals (M is an integer of 2 or more) each representing a binary value and receive M coefficients and output an output signal representing a binary value, the arithmetic device comprising:
a first resistor connected between a voltage source and a first comparison terminal, the voltage source being configured to generate a predetermined power supply voltage;
a second resistor connected between the voltage source and a second comparison terminal, the second resistor having a same resistance value as the first resistor;
a comparator configured to output the output signal representing a value corresponding to a result of comparison between a first voltage generated at the first comparison terminal and a second voltage generated at the second comparison terminal;

M cross switches provided corresponding to the M input signals; and

M coefficient circuits provided corresponding to the M coefficients, wherein each of the M cross switches performs switching between a straight state in which a positive input terminal is connected to a positive output terminal and a negative input terminal is connected to a negative output terminal and a reverse state in which the positive input terminal is connected to the negative output terminal and the negative input terminal is connected to the positive output terminal, in each of the M cross switches, the positive input terminal is connected to the first comparison terminal, and the negative input terminal is connected to the second comparison terminal, the M cross switches correspond one-to-one to the M coefficient circuits, each of the M coefficient circuits includes a first constant current source and a second constant current source, and is capable of changing a current difference between a current flowing through the first constant current source and a current flowing through the second constant current source, and in each of the M coefficient circuits, the first constant current source is connected between the positive output terminal of the corresponding cross switch and a reference potential, and the second constant current source is connected between the negative output terminal of the corresponding cross switch and the reference potential.

2. The arithmetic device according to claim 1, wherein each of the M cross switches performs switching between the straight state and the reverse state according to a value of the corresponding input signal, and each of the M coefficient circuits changes the current difference according to the corresponding coefficient.

3. The arithmetic device according to claim 2, wherein each of the M coefficients represents a binary value, and each of the M coefficient circuits switches according to the corresponding coefficient between a first state in which the first constant current source sends a current having a first current value and the second constant current source sends a current having a second current value different from the first current value and a second state in which the first constant current source sends the current having the second current value and the second constant current source sends the current having the first current value.

4. The arithmetic device according to claim 3, further comprising a setting circuit configured to receive the M coefficients prior to reception of the M input signals and set the coefficient circuits to either the first state or the second state according to the respective received M coefficients.

5. The arithmetic device according to claim 3, wherein each of the first constant current source and the second constant current source includes a current mirror circuit having a reference current changed according to the corresponding coefficient.

6. The arithmetic device according to claim 3, wherein each of the first constant current source and the second constant current source includes a Schottky barrier diode including a gate terminal for changing a height of a Schottky barrier, and the Schottky barrier diode is applied with a reverse bias by voltage generated from the voltage source.

7. The arithmetic device according to claim 6, wherein, in each of the first constant current source and the second constant current source, a back bias voltage applied to the gate terminal is changed according to the corresponding coefficient.

8. The arithmetic device according to claim 7, wherein each of the first constant current source and the second constant current source includes a first capacitor connected to the gate terminal, and charges according to the corresponding coefficient are injected into the first capacitor.

9. The arithmetic device according to claim 6, wherein the first resistor and the second resistor are variable resistors, and the arithmetic device further comprises:
a temperature acquisition circuit configured to acquire a temperature of the Schottky barrier diode; and
a temperature compensation circuit configured to change the resistance value of the first resistor and the second resistor according to the temperature so that a maximum value or a minimum value of the first voltage and the second voltage falls within a set range.

10. The arithmetic device according to claim 7, further comprising:
a temperature acquisition circuit configured to acquire a temperature of the Schottky barrier diode; and
a temperature compensation circuit configured to change the back bias voltage according to the temperature so that the first constant current source and the second constant current source included in each of the M coefficient circuits send the current having the first current value or the current having the second current value.

11. An arithmetic device configured to receive M input signals (M is an integer of 2 or more) each representing a binary value and receive M coefficients and output an output signal representing a binary value, the arithmetic device comprising:

a first resistor connected between a voltage source and a first comparison terminal, the voltage source being configured to generate a predetermined power supply voltage;

a second resistor connected between the voltage source and a second comparison terminal, the second resistor having a same resistance value as the first resistor;

a comparator configured to output the output signal representing a value corresponding to a result of comparison between a first voltage generated at the first comparison terminal and a second voltage generated at the second comparison terminal;

M cross switches provided corresponding to the M input signals; and

M coefficient circuits provided corresponding to the M coefficients, wherein each of the M cross switches performs switching between a straight state in which a positive input terminal is connected to a positive output terminal and a negative input terminal is connected to a negative Output terminal and a reverse state in which the positive input terminal is connected to the negative output terminal and the negative input terminal is connected to the positive output terminal, in each of the M cross switches, the positive input terminal is connected to the first comparison terminal, and the negative input terminal is connected to the second comparison terminal, the M cross switches correspond one-to-one to the M coefficient circuits, each of the M coefficient circuits includes a first constant current source and a second constant current source, and is capable of changing a current difference between a current flowing through the first constant current source and a current flowing through the second constant current source, in each of the M coefficient circuits, the first constant current source is connected between the positive output terminal of the corresponding cross switch and a reference potential, and the second constant current source is connected between the negative output terminal of the corresponding cross switch and the reference potential, and each of the first constant current source and the second constant current source includes a current mirror circuit having a reference current changed according to the corresponding coefficient.

12. An arithmetic device configured to receive M input signals (M is an integer of 2 or more) each representing a binary value and receive M coefficients and output an output signal representing a binary value, the arithmetic device comprising:

a first resistor connected between a voltage source and a first comparison terminal, the voltage source being configured to generate a predetermined power supply voltage;

a second resistor connected between the voltage source and a second comparison terminal, the second resistor having a same resistance value as the first resistor;

a comparator configured to output the output signal representing a value corresponding to a result of comparison between a first voltage generated at the first comparison terminal and a second voltage generated at the second comparison terminal;

M cross switches provided corresponding to the M input signals; and

M coefficient circuits provided corresponding to the M coefficients, wherein each of the M cross switches performs switching between a straight state in which a positive input terminal is connected to a positive output terminal and a negative input terminal is connected to a negative output terminal and a reverse state in which the positive input terminal is connected to the negative output terminal and the negative input terminal is connected to the positive output terminal, in each of the M cross switches, the positive input terminal is connected to the first comparison terminal, and the negative input terminal is connected to the second comparison terminal, the M cross switches correspond one-to-one to the M coefficient circuits, each of the M coefficient circuits includes a first constant current source and a second constant current source, and is capable of changing a current difference between a current flowing through the first constant current source and a current flowing through the second constant current source, in each of the M coefficient circuits, the first constant current source is connected between the positive output terminal of the corresponding cross switch and a reference potential, and the second constant current source is connected between the negative output terminal of the corresponding cross switch and the reference potential, and each of the first constant current source and the second constant current source includes a Schottky barrier diode including a gate terminal for changing a height of a Schottky barrier, and the Schottky barrier diode is applied with a reverse bias by voltage generated from the voltage source.

13. The arithmetic device according to claim 12, wherein each of the M cross switches performs switching between the straight state and the reverse state according to a value of the corresponding input signal, and each of the M coefficient circuits changes the current difference according to the corresponding coefficient.

14. The arithmetic device according to claim 13, wherein each of the M coefficients represents a binary value, and each of the M coefficient circuits switches according to the corresponding coefficient between a first state in which the first constant current source sends a current having a first current value and the second constant current source sends a current having a second current value different from the first current value and a second state in which the first constant current source sends the current having the second current value and the second constant current source sends the current having the first current value.

15. The arithmetic device according to claim 12, wherein, in each of the first constant current source and the second constant current source, a back bias voltage applied to the gate terminal is changed according to the corresponding coefficient.

16. The arithmetic device according to claim 13, wherein each of the first constant current source and the second constant current source includes a first capacitor connected to the gate terminal, and charges according to the corresponding coefficient are injected into the first capacitor.

17. The arithmetic device according to claim 14, wherein the first resistor and the second resistor are variable resistors, and the arithmetic device further comprises:

a temperature acquisition circuit configured to acquire a temperature of the Schottky barrier diode; and a temperature compensation circuit configured to change the resistance value of the first resistor and the second resistor according to the temperature so that a maximum value or a minimum value of the first voltage and the second voltage falls within a set range.

18. The arithmetic device according to claim 13, further comprising:

a temperature acquisition circuit configured to acquire a temperature of the Schottky barrier diode; and a temperature compensation circuit configured to change the hack bias voltage according to the temperature so that the first constant current source and the second constant current source included in each of the M coefficient circuits send the current having the first current value or the current having the second current value.

* * * * *